United States Patent
Nainar et al.

(10) Patent No.: US 10,148,560 B2
(45) Date of Patent: Dec. 4, 2018

(54) ENHANCED ERROR SIGNALING AND ERROR HANDLING IN A NETWORK ENVIRONMENT WITH SEGMENT ROUTING

(71) Applicant: CISCO TECHNOLOGY, INC., San Jose, CA (US)

(72) Inventors: Nagendra Kumar Nainar, Morrisville, NC (US); Carlos M. Pignataro, Raleigh, NC (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 15/222,643

(22) Filed: Jul. 28, 2016

(65) Prior Publication Data
US 2018/0034727 A1    Feb. 1, 2018

(51) Int. Cl.
H04L 12/703    (2013.01)
H04L 12/781    (2013.01)
H04L 12/741    (2013.01)
H04L 12/721    (2013.01)
H04L 12/707    (2013.01)

(52) U.S. Cl.
CPC .............. *H04L 45/28* (2013.01); *H04L 45/22* (2013.01); *H04L 45/52* (2013.01); *H04L 45/72* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 9,838,246 B1 * | 12/2017 | Hegde | H04L 41/0668 |
| 2004/0218550 A1 | 11/2004 | Kim | |
| 2008/0062924 A1 | 3/2008 | Kasapidis | |
| 2008/0247397 A1 * | 10/2008 | Gillet | H04L 45/04 370/392 |
| 2010/0063988 A1 * | 3/2010 | Khalid | G06F 15/16 709/202 |
| 2012/0051236 A1 | 3/2012 | Hegde et al. | |

(Continued)

OTHER PUBLICATIONS

Contra, A, "Internet Control Message Protocol (ICMPv6) for the Internet Protocol Version 6 (IPv6) Specification," Network Working Group, RFC 4443, Mar. 2006, 24 pages.*

(Continued)

*Primary Examiner* — George C Atkins

(57) ABSTRACT

Embodiments include generating an error message based on an error associated with a b packet, adding to the error message an address of a node in a segment routing domain of a network to serve as a destination address of the error message, and adding a new segment routing header to the error message. Embodiments also include rewriting the packet where the rewriting includes replacing a destination address in the packet with a final destination address associated with the packet. Embodiments further include adding the rewritten packet to the error message, and forwarding the error message to the destination address of the error message. In specific embodiments, the rewriting the packet includes removing a segment routing header of the packet. More specific embodiments include deriving the new segment routing header from information in the packet.

21 Claims, 16 Drawing Sheets

(56) References Cited

U.S. PATENT DOCUMENTS

| | | | |
|---|---|---|---|
| 2013/0229922 A1 | 9/2013 | Li et al. | |
| 2014/0126354 A1* | 5/2014 | Hui | H04L 29/14 370/225 |
| 2014/0269422 A1* | 9/2014 | Filsfils | H04L 41/12 370/254 |
| 2015/0256456 A1* | 9/2015 | Previdi | H04L 45/745 370/392 |

OTHER PUBLICATIONS

Previdi, S., et al., "IPv6 Segment Routing Header (SRH)," Network Working Group, Internet Draft, Mar. 18, 2016, 29 pages; https://tools.ietf.org/html/draft-ietf-6man-segment-routing-header-01.

Ghein, "MPLS Fundamentals: Forwarding Labeled Packets," Cisco Press, Jan. 5, 2007, 14 pages; http://www.ciscopress.com/articles/printerfriendly/680824.

Postel, J., "Internet Control Message Protocol—DARPA Internet Program Protocol Specification," Network Working Group, RFC 792, Sep. 1981, 21 pages; https://tools.ietf.org/html/rfc792.

Conta, A., "Internet Control Message Protocol (ICMPv6) for the Internet Protocol Version 6 (IPv6) Specification," Network Working Group, RFC 4443, Mar. 2006, 24 pages; https://tools.ietf.org/html/rfc4443.

Bonica, R., "Extended ICMP to Support Multi-Part Messages," Network Working Group, RFC 4884, Apr. 2007, 19 pages; https://tools.ietf.org/html/rfc4884.

"Segment Routing and Path Computation Element," Alcatel Lucent, Technology White Paper, May 2015, 28 pages; http://www.tmcnet.com/tmc/whitepapers/documents/whitepapers/2015/11525-segment-routing-path-computation-element-using-traffic-engineering.pdf.

Filsfils, C., et al., "Segment Routing Architecture," Network Working Group, May 11, 2016, 24 pages; https://tools.ietf.org/html/draft-ietf-spring-segment-routing-08.

\* cited by examiner

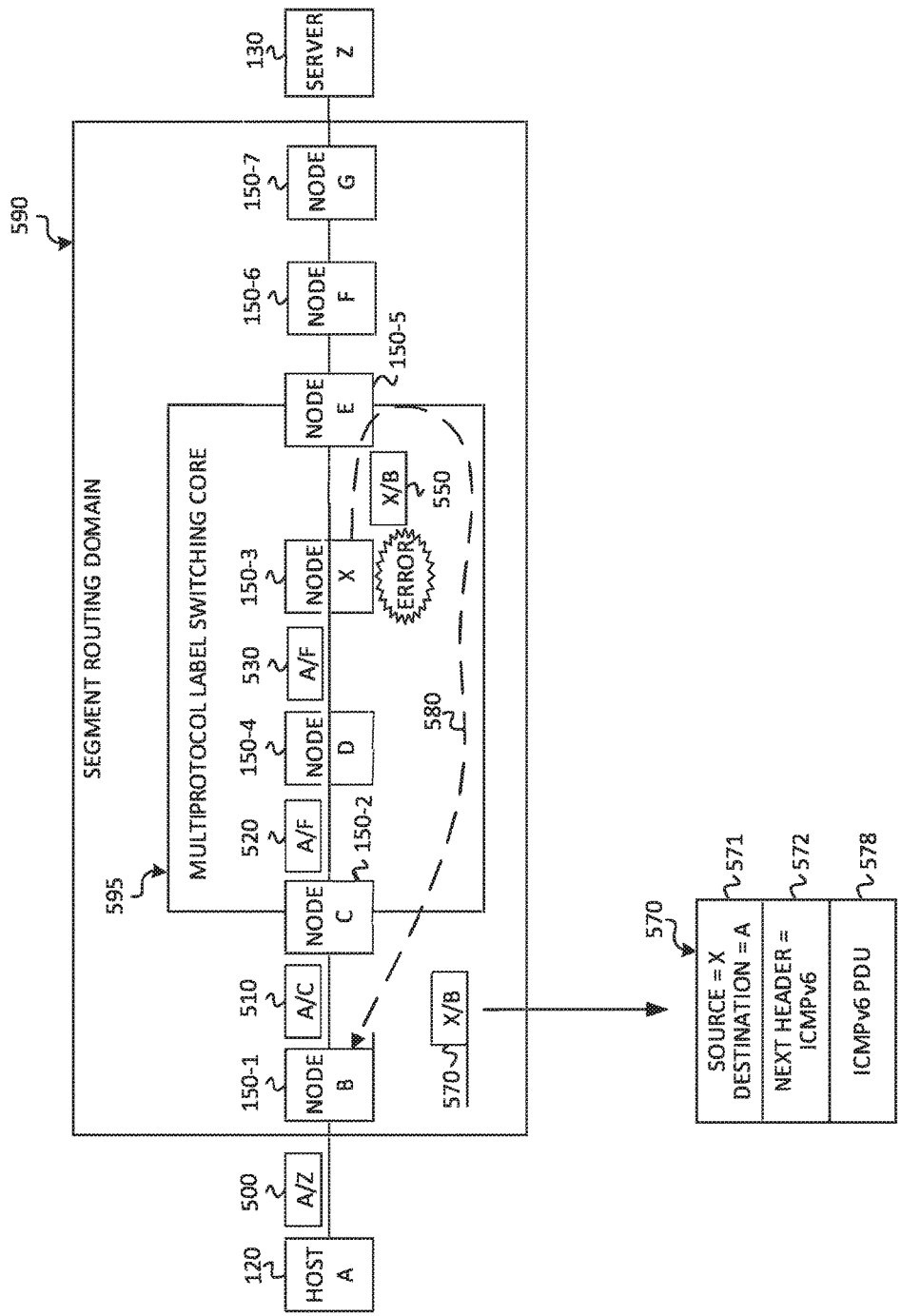

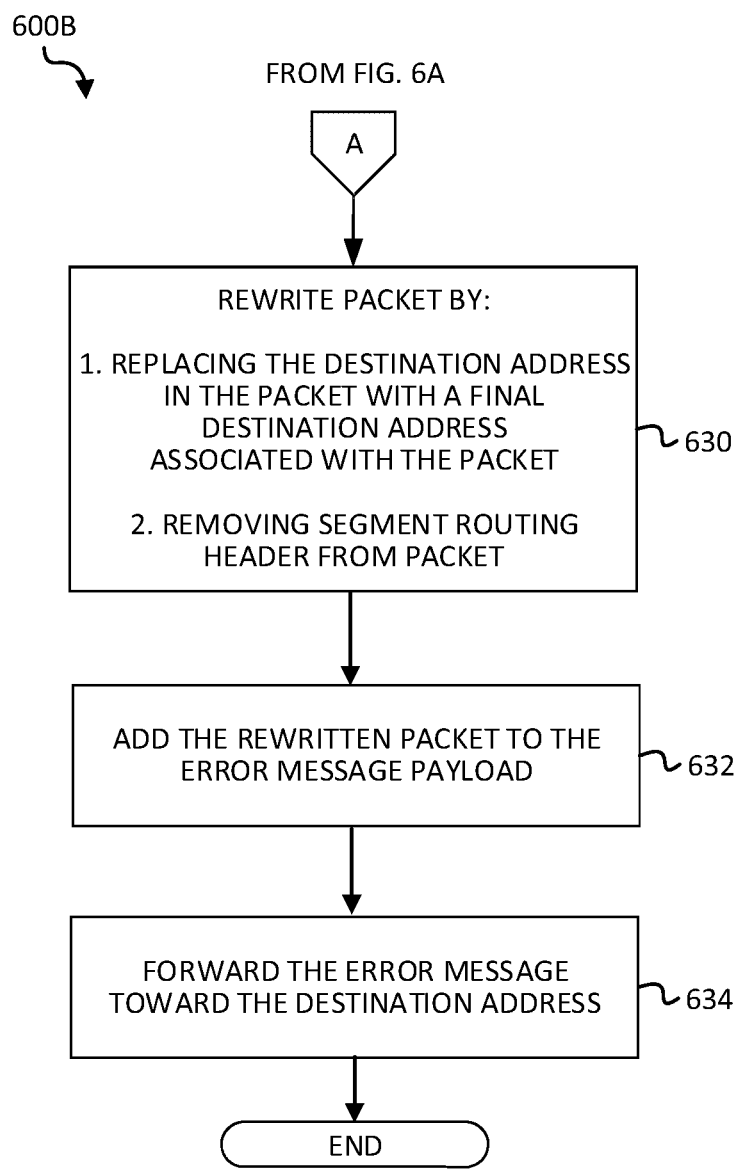

ENHANCED ERROR SIGNALING AND ERROR HANDLING IN A NETWORK ENVIRONMENT WITH SEGMENT ROUTING

TECHNICAL FIELD

This disclosure relates in general to the field of networking, and more particularly, to enhanced error signaling and error handling in a network environment with segment routing.

BACKGROUND

In computer networking, segment routing is source based routing where the source chooses a path and encodes it in a packet header as an ordered list of segments. Segment routing is applicable in at least multiprotocol label switching (MPLS) and Internet Protocol version 6 (IPv6) dataplane. In IPv6, a new extension header, referred to as a 'segment routing header' or 'SRH', is used by a packet to carry an ordered list of segments to help make routing decisions for the packet. A segment can be an encoded IPv6 address. Thus, an ordered list of segments can be encoded as an ordered list of IPv6 addresses. A pointer can be used to indicate which segment to process at a given node. Upon a segment being processed by a node, the pointer can be modified to point to the next segment in the ordered list. In MPLS, a segment can be encoded as an MPLS label. An ordered list of segments can be encoded as a stack of labels. Upon a segment being processed by a node, the associated label is popped from the stack.

In a segment routing architecture, per-flow routing states are not maintained in nodes other than the ingress node to a segment routing domain, which can be a source node in some implementations. Thus, managing packet transmission errors in a segment routing domain presents a significant challenge to traffic engineers and administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 5A-5D are simplified block diagrams illustrating yet another example scenario of enhanced error signaling and error handling in the communication system according to at least one embodiment; and FIGS. 6A-6B are simplified flowcharts of potential operations associated with the communication system according to at least one embodiment.

DETAILED DESCRIPTION OF EMBODIMENTS

Overview

Figure 1:
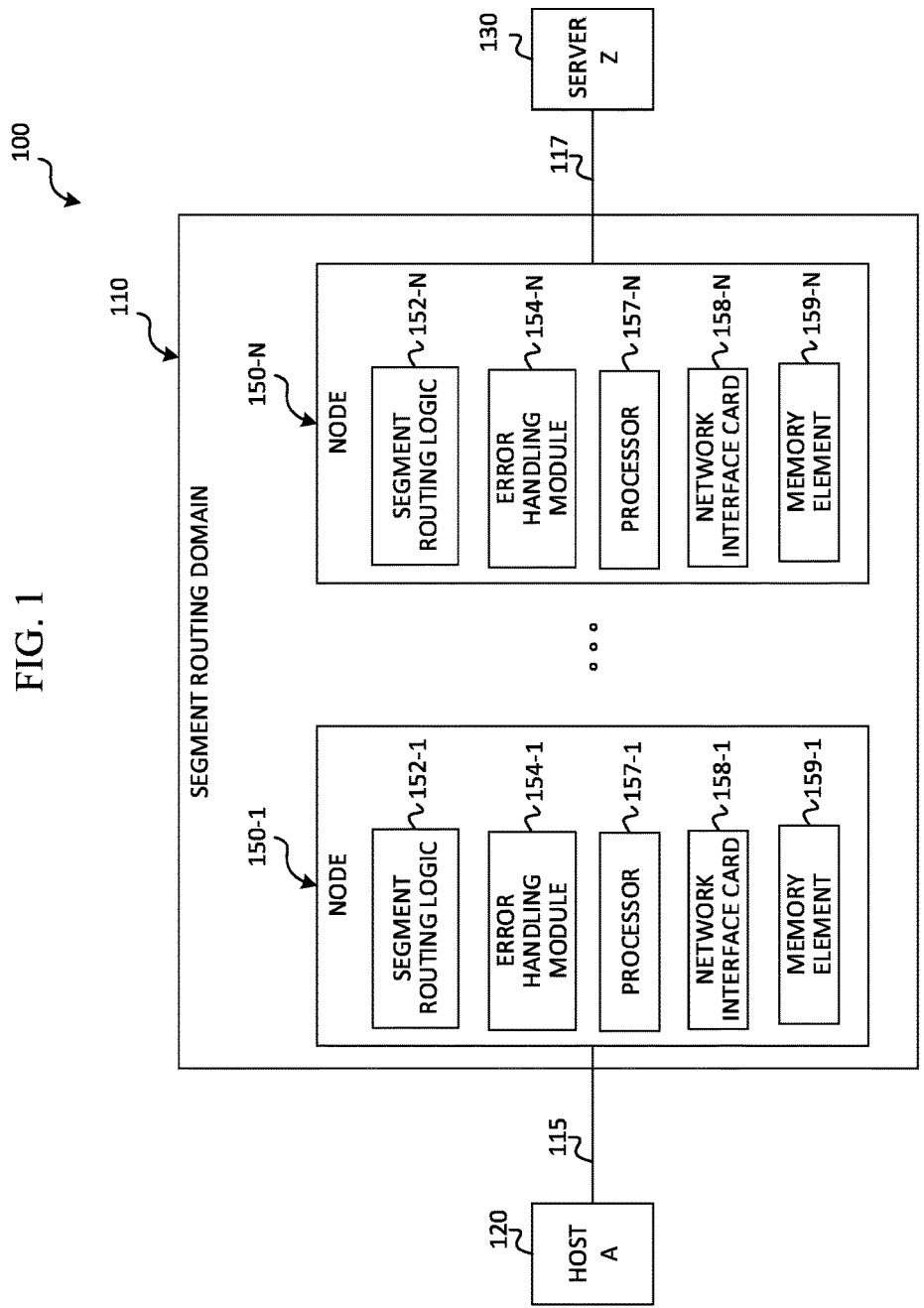
FIG. 1 is a simplified block diagram of an example communication system for enhanced error signaling and error handling in a network environment using segment routing according to at least one embodiment of the present disclosure.

The present disclosure describes methods of enhanced error signaling and error handling in a network environment with segment routing. In one example in the present disclosure, a method includes generating an error message based on an error associated with a packet, adding to the error message an address of a node in a segment routing domain of a network to serve as a destination address of the error message, adding a new segment routing header to the error message, rewriting the packet, the rewriting including replacing a destination address in the packet with a final destination address associated with the packet, adding the rewritten packet to the error message, and forwarding the error message to the destination address of the error message.

In more specific embodiment, the method includes deriving the new segment routing header from information in the packet. In further specific embodiment, the method includes obtaining a copy of a source address of the packet, adding the copy of the source address as a segment in a segment list of the new segment router header, and indicating the segment is the last segment remaining in the segment list to be processed. A segment left field of the new segment routing header can be set to a value of one to indicate the segment is the last segment remaining in the segment list to be processed. In addition, the segment list can include one or more segments representing one or more nodes in a path along which the error message is to be routed.

In yet further specific embodiments, rewriting the packet can include removing a segment routing header of the packet. A segment list of a segment routing header of the packet can include one or more segments representing one or more nodes of the network, and the method can include determining the final destination address by identifying the last segment in the segment list based on a routing order of the one or more segments.

In yet more specific embodiments, the node in the segment routing domain can be an egress node of a Border Gateway Control (BGP) free core of the segment routing domain. Furthermore, the node in the segment routing domain could be an egress node of the segment routing domain. The method can include determining the address of the node to add to the error message by identifying an address of the egress node in a policy list of a segment routing header of the packet. Alternatively, the method can include determining the address of the node to add to the error message by identifying a next-to-last segment in a segment list of a segment routing header of the packet. In another alternative, the node to add to the error message could be an ingress node of the segment routing domain.

Some or all of the elements, operations, and features may be included in respective systems, apparatuses, and devices for performing the described functionality. Furthermore, some or all of the features may be implemented in at least one machine-readable storage medium.

Description

FIG. 1 is a simplified block diagram of a communication system 100 for enhanced error signaling and error handling in a network environment with segment routing. In at least one embodiment, communication system 100 can be configured to provide enhanced error signaling and error handling for Internet Control Message Protocol version 6 (ICMPv6), which is a protocol resulting from Internet Protocol version 6 (IPv6) using Internet Control Message Protocol (ICMP) with some changes. Communication system 100 is also applicable to Multi Protocol Label Switching (MPLS) architecture.

Communication system 100 includes a host A 120 and a server Z 130 in a network environment including a segment routing domain 110. The network environment may comprise one or more networks such as networks 115 and 117. Nodes 150-1 through 150-N may be provisioned in segment routing domain 110 with segment routing capabilities, such that they provide a path for network traffic between host A and server Z. In at least one embodiment, each node 150-1 through 150-N includes, respectively, segment routing logic 152-1 through 152-N, an error handling module 154-1 through 154-N, at least one processor 157-1 through 157-N, at least one network interface card 158-1 through 158-N, and at least one memory element 159-1 through 159-N. For ease of reference, nodes 150-1 through 150-N may be collectively referred to herein as nodes 150, and the elements of nodes 150 may be similarly referenced.

For purposes of illustrating certain example techniques of communication system 100, it is important to understand the communications that may be traversing the network and the segment routing domain, and the protocols used in effecting such communications. The following foundational information may be viewed as a basis from which the present disclosure may be properly explained.

Segment routing is applicable in both multiprotocol label switching (MPLS) and Internet Protocol version 6 (IPv6) dataplane. In IPv6, a segment routing header is used to carry a segment list. A segment list is a series of segment identifiers (also referred to herein as 'segments') that specify a particular path through the network that the packet is to traverse to reach a final destination node. Segments can be encoded as one or more IPv6 addresses or MPLS labels.

Figure 2:
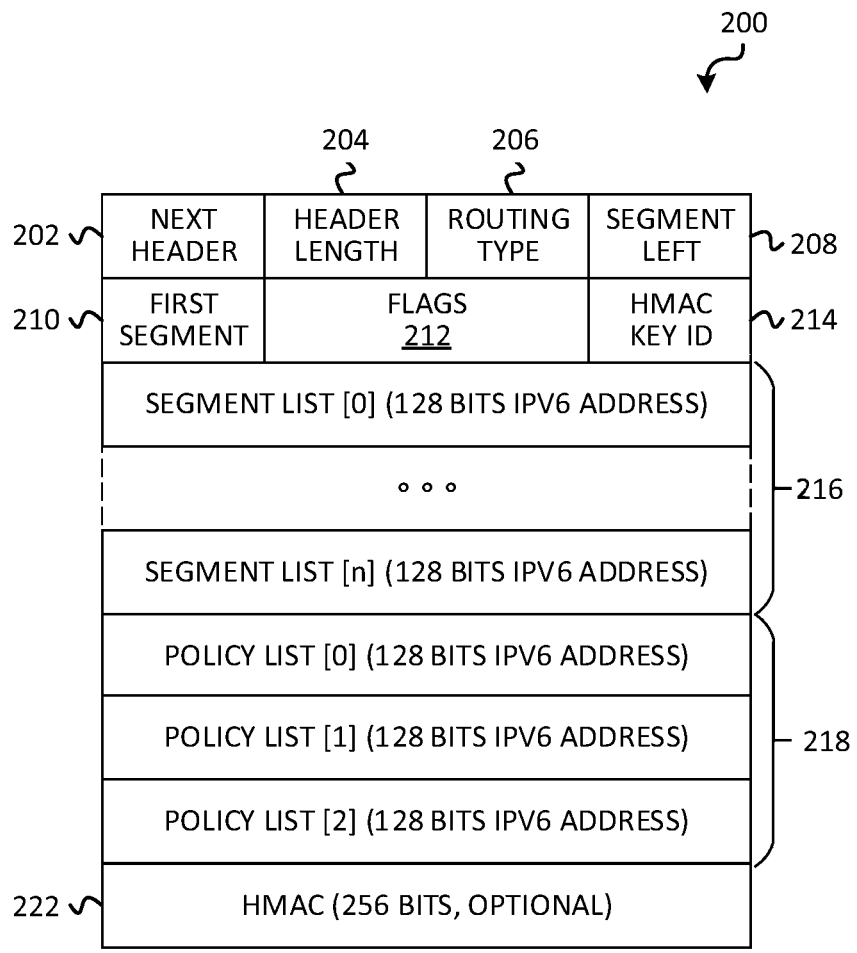
FIG. 2 is an illustration of an example segment routing header (SRH) that may be used in the communication system according to at least one embodiment.

An example format of this new segment routing header (SRH) 200 is shown in FIG. 2. A next header field 202 is an 8-bit selector that identifies the type of header immediately following the SRH. A header length field 204 is an 8-bit unsigned integer that defines the length of the SRH header in 8-octet units, not including the first eight octets. A routing type field 206 indicates the new routing type. A segment left field 208 is an index, in the segment list, of the current active segment in the SRH. The index is decremented at each segment endpoint. A first segment field 210 is an offset in the SRH, not including the first 8 octets and expressed in 16-octet units, pointing to the last element of the segment list (i.e., that contains the first segment of the path). Flags field 212 includes 16 bits of flags including cleanup (bit 0), rerouted packet (bit 1), reserved (bits 2, 3), policy flags (bits 4-15).

The policy flags define the type of IPv6 addresses encoded into the policy list 218. Each address is described by 3 bits: not present (0x0), ingress segment routing (SR) provider edge (PE) address (0x1), egress SR PE address (0x2), and original source address (0x3). Policy list fields 218 contain addresses representing specific nodes in the SR path: (1) ingress SR PE, which is an IPv6 address representing the SR node that has imposed the SRH (ingress SR domain node), (2) egress SR PE, which is the IPv6 address representing the egress SR domain node, and (3) original source address, which is the IPv6 address originally present in the source address field of the packet.

Segment list fields 216 include 128-bit IPv6 addresses representing each segment of a forward path for the packet. The segment list is encoded in the reverse order of the path. The last segment is in the first position of the list and the first segment is in the last position. An HMAC key ID field 214 and an HMAC field 222 contain the SRH authentication, if any.

Several segment routing scenarios are possible for flows traversing a segment routing domain. A first scenario involves single encapsulation of packets of a flow. An ingress node of a segment routing domain inserts an SRH into an existing IPv6 header of a packet, which includes a stack (or list) of segments. The segments can include addresses of nodes in the segment routing domain and an address of a final destination of the packet.

A second segment routing scenario involves double encapsulation of packets of a flow (e.g., IPv6-in-IPv6). A packet sent by a source node is not altered, but an ingress node of a segment routing domain that receives the packet can encapsulate the packet with a new header that includes the address of the ingress node as the source address. A destination address of the new header is based on the segment list, and an SRH is pushed into the new outer header.

A third segment routing scenario involves an end-to-end segment routing domain. In this scenario, a source node sends packets of a flow with a segment routing header already included. An ingress node of a segment routing domain can modify the SRH, potentially including the destination address, but does not change the source address.

In segment routing scenarios, certain errors associated with a packet traversing a segment routing domain may occur and cause an error message to be generated and reported to the source node. In addition, the packet associated with the error message may be dropped such that the packet is not forwarded toward the final destination. Error messages may be generated according to Internet Control Message Protocol version 6 (ICMPv6). Examples of errors that may occur include, but are not limited to, determining that a packet is too big for transmission (i.e., packet too big (PTB) error message), and the expiration of a time-to-live (TTL) parameter set for the packet. A PTB error may occur at a node when a packet size is determined to be more than a maximum transmission unit associated with the physical link between the node and a next node in the path. A TTL error may occur if the number of hops or nodes that a packet crosses exceeds a maximum number allowed.

When a transit node in a segment routing domain generates an error message to be sent to a source node, certain issues may arise. A transit node is a node in a forward path of a packet between two other nodes specified in the segment list. The transit node, however, is not represented by a segment in the segment list of the packet. A first issue may arise because a transit node may not be aware of the actual source of a packet and thus, may not be capable of delivering an error message back to the source. This could occur, for example, in single encapsulation or end-to-end segment routing scenarios. A second issue arises when a source receives an error message with a payload carrying a packet with header information that is different from the header information originally generated for the packet by the source. Consequently, the source may not be able to correlate the error message with a flow in order to take actions or respond appropriately.

For example, in a single encapsulation scenario, a packet originated by a source (e.g., host A 120) contains a source address, a destination address (e.g., of a final destination node such as server Z 130), but no segment routing header. When the packet is dropped by a transit node in a segment routing domain, the packet may contain the original source address (e.g., of host A 120), a destination address within the segment routing domain (e.g., segment routing domain 110), and an SRH. The final destination address in the original packet sent by the source may have been replaced by an address of an intermediate node in the segment path. Thus, copying the dropped packet into a payload of an ICMPv6 error message can confuse the original source (e.g., host A 120) and prevent the source from correlating the packet to its flow.

In another example, nodes in an end-to-end segment routing configuration that route traffic between a source and a destination may be provisioned in a Border Gateway Protocol (BGP) free core. For example, in communication system 100 of FIG. 1, a BGP free core can correspond to nodes 150, with the segment routing domain encompassing nodes 150, host A 120, and server Z 130. In an end-to-end scenario, a packet sent by a source (e.g., host A 120) can contain a source address, a destination address of a node within the BGP free core, and an SRH. When the packet is dropped by a transit node in the BGP free core, the packet contains the original source address (e.g., of host A 120), a destination address within the BGP free core, and an SRH. The destination address when the packet is dropped may be different from a final destination address associated with a node (e.g., server 130) to which the packet is being sent. Thus, copying the dropped packet into the payload of an ICMPv6 error message can confuse the original source (e.g., host A 120) and prevent the source from correlating the packet to its flow.

Embodiments of a communication system as described herein can resolve the aforementioned issues (and more) associated with enhanced error signaling and error handling in a network environment using segment routing. In communication system 100, when an error associated with a packet of a flow is detected at a node in a segment routing domain that receives the packet (e.g., nodes 150), an error message can be generated. In one example, an error message can be generated using ICMPv6. The packet associated with the detected error can be rewritten before imposing it in the error message. In particular, the destination address in the packet header can be rewritten to be the original destination address indicated by the source, and the segment routing header in the packet may be removed. In addition, information from the packet can be leveraged to deliver the rewritten packet to the correct source via the error message.

Several advantages are provided by embodiments disclosed herein. First, embodiments disclosed herein offer a solution for error handling problems that may occur in segment routing topologies such as, for example, IPv6 network environments with segment routing. In particular, operational black holes may occur with error signals being dropped, error messages not reaching the correct source node, or error messages not containing useful information. Embodiments described herein enable the correct source node to receive error messages that contain information to enable the source node to correlate each error message with a particular flow. Thus, the source node can, based on this knowledge, take appropriate actions or otherwise respond appropriately to the particular error that caused the error message.

With reference to FIG. 1, a description of the infrastructure of communication system 100 is now provided. Generally, communication system 100 can be implemented in any type or topology of networks. Within the context of the disclosure, networks such as network 115 and network 117 represent a series of points, nodes, or network elements of interconnected communication paths for receiving and transmitting packets of information that propagate through communication system 100. These networks offer communicative interfaces between sources, destinations, and intermediate nodes, and may include any local area network (LAN), virtual local area network (VLAN), wide area network (WAN) such as the Internet, wireless local area network (WLAN), metropolitan area network (MAN), Intranet, Extranet, virtual private network (VPN), and/or any other appropriate architecture or system that facilitates communications in a network environment or any suitable combination thereof. Additionally, radio signal communications over a cellular network may also be provided in communication system 100. Suitable interfaces and infrastructure may be provided to enable communication with the cellular network.

Communications in communication system 100 are also referred to herein as 'network traffic' or 'traffic', which may be inclusive of packets. Additionally, messages, requests, responses, replies, queries, etc. are forms of network traffic, and therefore, may comprise packets. Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). Suitable communication messaging protocols may have multiple communication layers, including at least a data link layer and a network layer, which are referred to herein as layer 2 (L2) and layer 3 (L3), respectively. Generally, L3 is responsible for packet forwarding and routing through intermediate switches/routers from a source to a destination. Network addresses (i.e., L3 addresses) are used to facilitate routing network traffic. In at least one embodiment, IP version 6 (IPv6) is associated with L3, and IPv6 addresses are L3 addresses that can be used to facilitate routing network traffic.

A packet is a formatted unit of data, and can contain both control information and data, which is also known as payload. Control information can include, but is not limited to, source network addresses, destination network addresses, source physical addresses, destination physical addresses, source ports, and destination ports. Within the context of the present disclosure, an error message comprises a packet that may include, but is not limited to, source and destination network addresses (also referred to herein as 'source and destination addresses'), one or more extension headers, and a protocol data unit (PDU). In embodiments disclosed herein, the one or more extension headers include a segment routing header (SRH). The one or more extension headers and PDU form the payload of the error message. The PDU may be generated for a particular protocol such as ICMPv6, and may contain its own headers and payload.

A 'network flow' or 'flow', as used herein, refers to a sequence of packets from a source node to a destination node. The term 'data' as used herein, refers to any type of binary, numeric, voice, video, textual, or script data, or any type of source or object code, or any other suitable information in any appropriate format that may be communicated from one point to another in electronic devices and/or networks.

Hosts, such as host A 120, can be associated with customers, end users, devices or nodes that can initiate a communication in communication system 100 via some network. The term 'host' is inclusive of devices used to initiate a communication, such as a desktop computer, laptop computer, tablet, mobile device, smart phone, smart appliance, gaming device, server, or any other device, component, element, or object capable of initiating voice, audio, video, media, or data exchanges within communication system 100. Hosts may also be inclusive of a suitable interface to a human user, such as a display, a keyboard, a touchpad, a remote control, or other terminal equipment. Hosts may also be any device that seeks to initiate a communication on behalf of another entity or element, such as a program, a database, or any other component, device, element, or object capable of initiating an exchange within communication system 100.

Servers, such as server Z 130, are inclusive of computing devices and other network elements capable of hosting and/or serving software applications and other programs, including local, distributed, enterprise, or cloud-based software applications. Servers can include, but are not limited to, service appliances, database servers, file servers, mail servers, print servers, web servers, gaming servers, application servers, etc. In some instances, some combination of servers can be hosted on a common computing system, server, or server pool, and share computing resources, including shared memory, processors, and interfaces, such as in an enterprise system providing services to a plurality of distinct clients and customers. It should be noted that communication system 100 is also applicable to hosts communicating with other hosts and servers communicating with other servers. For ease of illustration, in various illustrations herein, host A represents an originating source of a network flow and server Z represents an intended final destination of the network flow. However, it should be apparent that server Z may be configured to originate network flows and host A may be configured to receive network flows initiated by other hosts or servers.

In at least one embodiment, nodes 150 can include nodes in a segment routing domain, such as segment routing domain 110 of communication system 100. These nodes may be specified in a segment list of a segment routing header (SRH) added to packets that traverse the segment routing domain. Nodes 150 can also include transit nodes that receive and forward or route packets between the nodes specified in the segment list. In at least one implementation, nodes 150 may be provisioned in segment routing domain 110 providing a single encapsulation segment routing topology. In at least one other implementation, nodes 150 may be provisioned in a BGP free core of an end-to-end segment routing topology. In another implementation, some of nodes 150 may be provisioned in a multiprotocol label switching (MPLS) core of the segment routing domain. Embodiments may also be configured for implementations in other segment routing topologies including, but not limited to, a double encapsulation segment routing topology.

Generally, nodes 150 are network elements that facilitate communications between hosts, servers, and other network elements. As used herein, the term 'network element' is meant to encompass any of the aforementioned elements, as well as routers, switches, gateways, bridges, load balancers, service appliances, firewalls, servers, processors, modules (any of which may be physical or virtually implemented on physical hardware) or any other suitable device, component, element, proprietary appliance, or object that is operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

In at least one example implementation, nodes 150 include logic to achieve (or to foster) the activities as outlined herein. Note that in at least one example, each of these elements (e.g., nodes 150) can have an internal structure (e.g., processors 157, memory elements 159, network interface cards 158, etc.) to facilitate some of the operations described herein. In some embodiments, these activities may be executed externally to these elements, or included in some other network element to achieve this intended functionality. In at least one embodiment, these nodes may include logic (or reciprocating logic) that can coordinate with other network elements, hosts and/or servers in order to achieve the operations, as outlined herein. Furthermore, one or several devices may include any suitable algorithms, hardware, firmware, software, components, modules, interfaces, or objects that facilitate the operations thereof.

At least some of the logic to achieve the error signaling and error handling activities described herein may be provisioned in error handling modules 154 of nodes 150. An error handling module of a node in a segment routing domain can be configured to rewrite a packet it receives if an error associated with the packet is detected. Rewriting the packet can include removing the segment routing header of the packet and rewriting the destination address of the packet before appending the rewritten packet to the payload of an error message. Specifically, in at least one embodiment, the rewritten packet could be added to the payload of an ICMPv6 protocol data unit (PDU), where the ICMPv6 PDU is contained in the payload of the error message. The error handling module may also be configured to derive a new segment routing header for the error message from the packet to be dropped. The new SRH can be appended to the error message, and the destination address of the error message can be set as the address of an egress provider edge (PE) node of the segment routing domain. Segment routing logic 152 may also be provided in nodes 150 to enable receiving and forwarding packets and error messages using segment routing headers. For example, the error message can be forwarded toward the destination address indicated in the error message (e.g., egress PE node address of the segment routing domain), which in turn, delivers it to the original source.

Figure 3A:
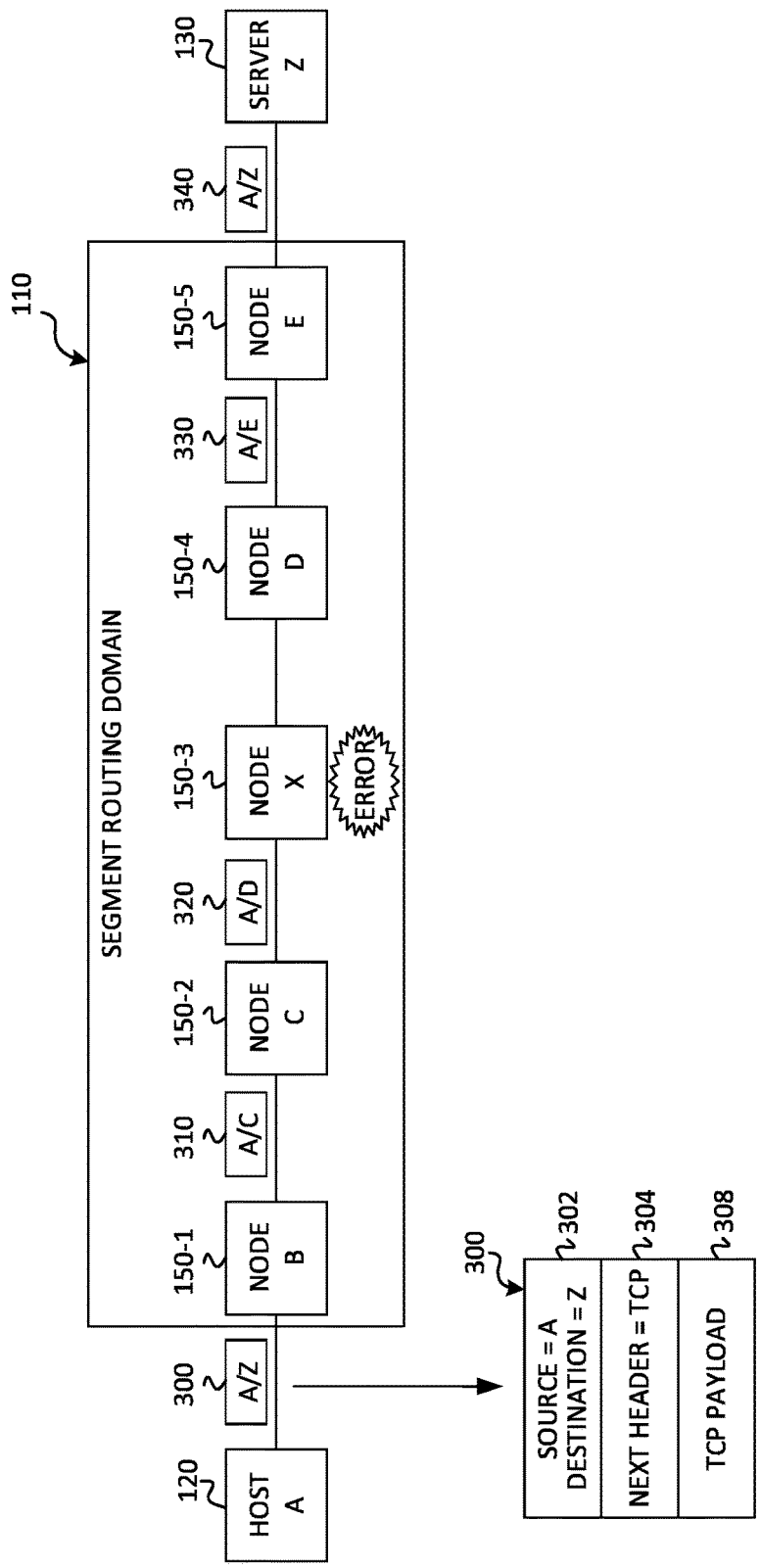
FIGS. 3A-3D are simplified block diagrams illustrating an example scenario of enhanced error signaling and error handling in the communication system according to at least one embodiment.

Turning to FIGS. 3A-3D, block diagrams are provided to illustrate an example scenario of error signaling and error handling in communication system 100 according to at least one embodiment. The example presented by FIGS. 3A-3D represents a single encapsulation segment routing implementation using ICMPv6. As shown in FIG. 3A, nodes 150-1 through 150-5 are located within segment routing domain 110. Node B 150-1, node C 150-2, node D 150-4, and node E 150-5 are nodes in a routing path between host A 120 and server Z 130. Node X 150-3 is a transit node in the path between node C and node D.

In this example, host A 120 initiates a network flow to server Z 130. Packet 300 is an example packet of the network flow originated by host A 120 to send to server Z 130. Packet 300 includes source and destination address fields 302, a next header field 304 and a payload field 308. In this example, packet 300 includes a source address for host A 120 and a destination address for server Z 130, a TCP next header, and a TCP payload. Although not shown, it will be apparent that the payload field may be part of a protocol data unit that includes one or more headers.

If no errors are detected by any node for packet 300, then packet 300 can be sent from host A and pass through nodes B, C, X, D, and E to reach server Z. The nodes can modify the packet headers to route the packet. For example, node B receives packet 300 and modifies it as packet 310 with a source address of host A and a destination address of node C. An ingress node of a segment routing domain can also add a segment routing header (SRH) to the packet. In this example, node B is the ingress node of segment routing domain 110 and, therefore, packet 310 can include an SRH added by node B. Node B forwards packet 310 to node C. Node C receives packet 310 and modifies it as packet 320 with a source address for host A and a destination address for node D. Node C can forward packet 320 toward node D. Assuming no errors are detected, transit node X can receive packet 320 and forward the packet to node D. Node D receives packet 320 and modifies it as packet 330 with a source address of host A and a destination address of node E. Node D forwards packet 330 to node E. Node E receives packet 330 and modifies it as packet 340 with a source address of host A and a destination address of server Z. Node E forwards packet 340 to the final destination, server Z.

If an error is detected in a node in segment routing domain 110, however, the packet may be dropped and not reach server Z. Embodiments disclosed herein enable error signaling and error handling when an error is detected in a node of segment routing domain 110. In the example shown in FIG. 3A, an error may be detected at transit node X 150-3, after receiving packet 320 from node C. If packet 320 is to be dropped, where it is not forwarded to the final destination, an error message (e.g., ICMPv6) can be generated and forwarded to the original source, host A 120.

Figure 3B:
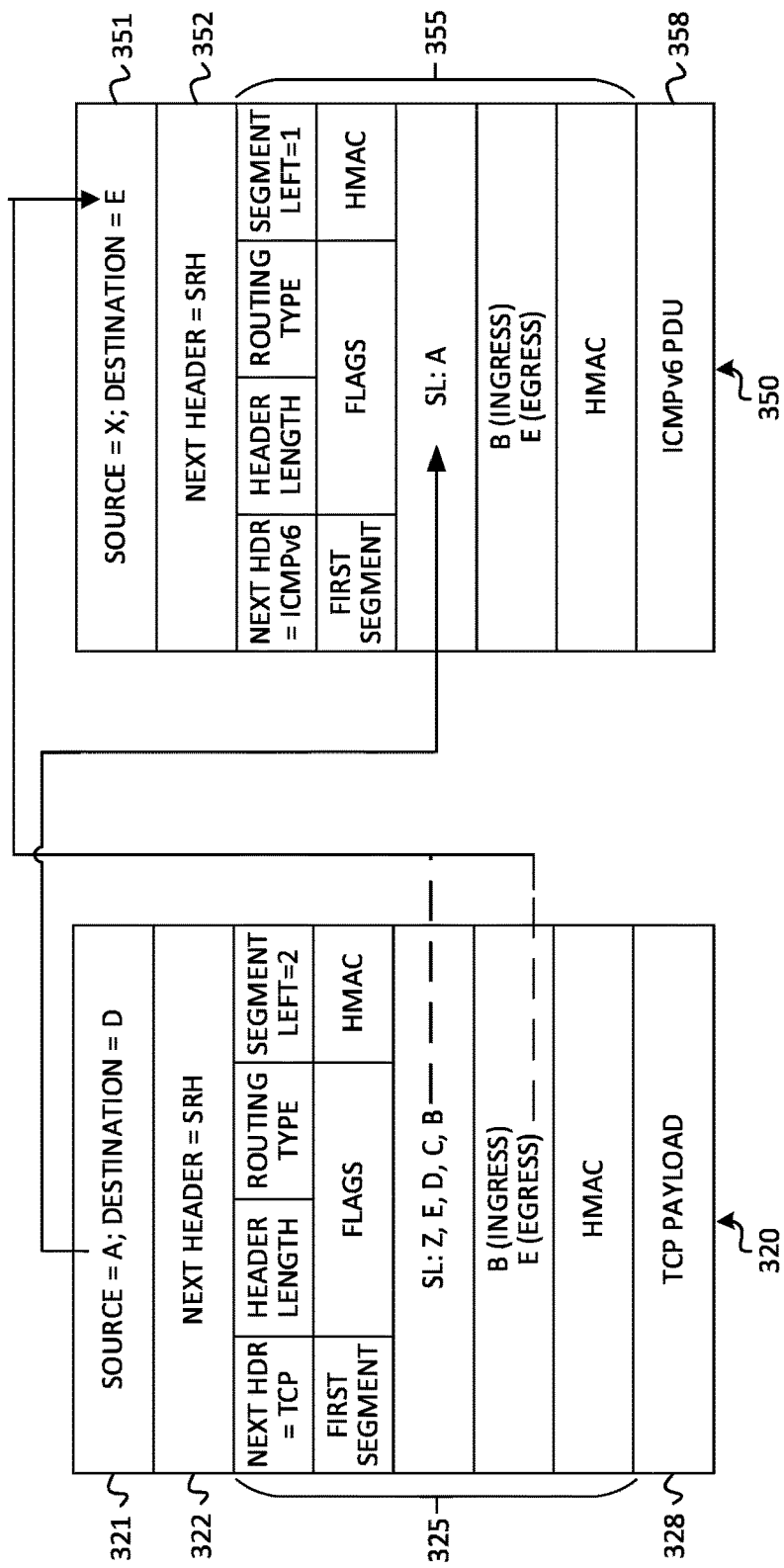

FIG. 3B illustrates additional possible details of packet 320 received by transit node X, and an example error message 350. Packet 320 can include source and destination address fields 321 set to the address of host A and the address of node D, respectively. Packet 320 can also include a next header field 322 set to SRH, a segment routing header (SRH) 325, and a payload 328 (e.g., TCP).

Transit node X can generate error message 350 and derive a new segment routing header (SRH) 355 to append to the error message. Error message 350 can include source and destination address fields 351, a next header field 352, new SRH 355, and an ICMPv6 packet data unit (PDU) 358. The address of the node generating the error message, which is transit node X in this example, can be added to the error message in the source address field at 351 to serve as the source address for the error message.

Information from packet 320 can be leveraged to ensure that error message 350 is delivered to the original source, host A. In particular, the source address field at 321 of packet 320 can be copied and added as the last segment in the segment list (SL) of new SRH 355 of error message 350. In at least some embodiments, the segment list of new SRH 355 may only contain one segment. The segment left field of new SRH 355 can be set to one, so that the last segment (i.e., address of host A) of the segment list is processed at the node indicated by the destination address at 351. The next header field of SRH 355 can be set to ICMPv6 in at least one embodiment, which indicates ICMPv6 PDU 358. Optionally, a new flag or policy of SRH 355 of error message 350 may also be set.

The destination address field at 351 of error message 350 may be populated by information from SRH 325 of packet 320. In one embodiment, packet 320 may carry ingress/egress segment routing node details such as addresses of the ingress and egress nodes of the segment routing domain. These details may be stored in a policy list of SRH 325. In this example, the address of egress node E may be copied from packet 320 and added to the destination address field at 351 of error message 350, to serve as the destination address of the error message.

If the egress node address is not provided in packet 320, however, then a next-to-last segment (i.e., last segment minus 1), based on routing order, can be determined from the segment list (SL) of SRH 325 in packet 320. In this example, the last segment of the routing path in the segment list is Z. As shown in FIG. 3B, the segment list itself may be configured in reverse routing order. Therefore, the next-to-last segment of the routing path in the segment list of packet 320 is E. Thus, the address of node E can be used to populate the destination address field at 351 of error message 350, and serve as the destination address for the error message.

In another embodiment, if ingress/egress segment routing node details are included in the policy list of SRH 325 in packet 320, then the ingress node address could be used for routing error message 350. The ingress node may be an ingress segment routing (SR) provider edge (PE) node. In this scenario and embodiment, routing may be optimized by copying the ingress SR PE node address from SRH 325 and adding the copied address to the destination address field at 351 of error message 350. This enables the ingress SR PE node address to serve as the destination address for the error message. The ingress SR PE node can then route the error message to the actual source, host A, after receiving the error message.

Figure 3C:
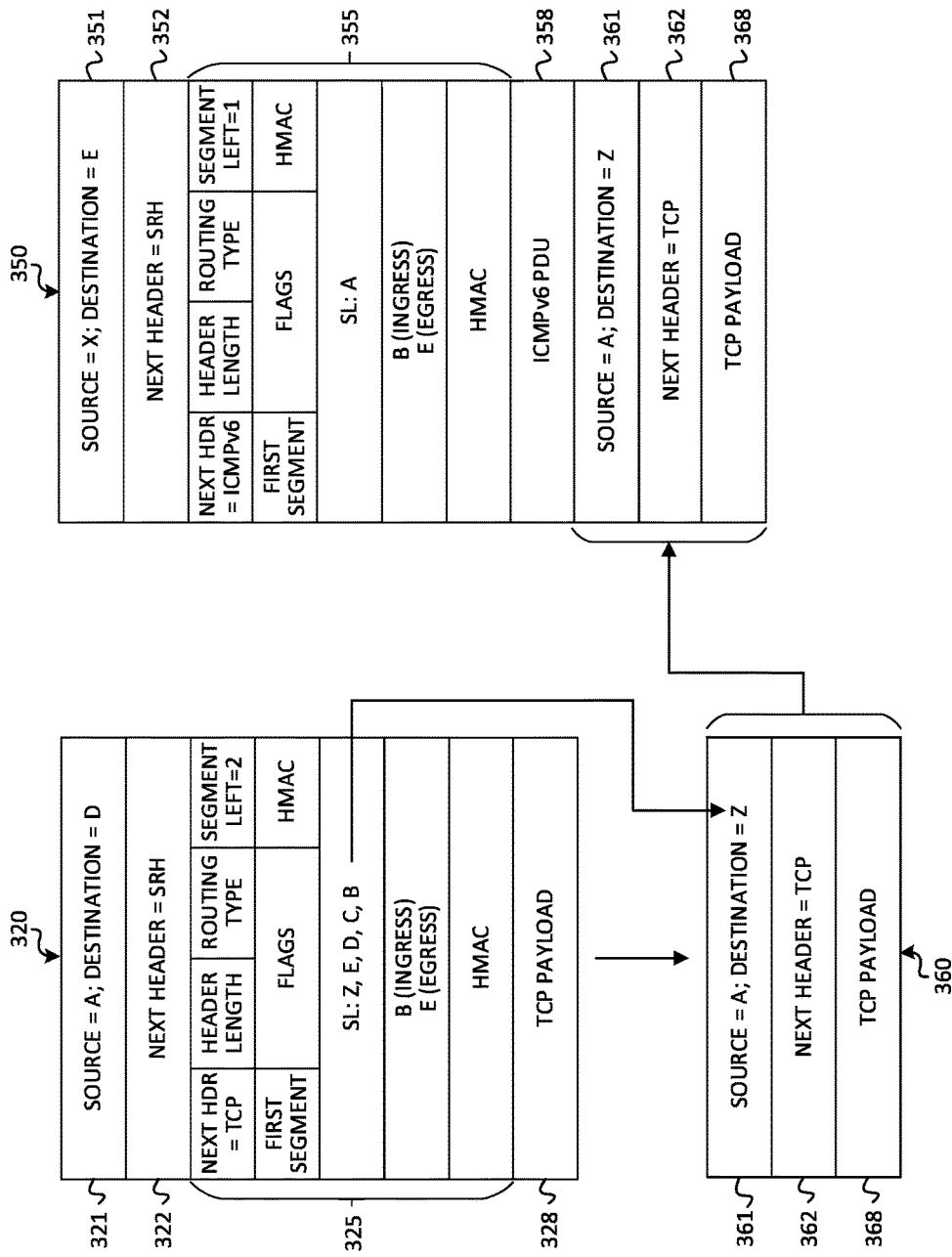

FIG. 3C illustrates additional details related to transit node X 150-3 generating error message 350. FIG. 3C shows packet 320, a rewritten packet 360, and error message 350 with rewritten packet 360 added to the payload of error message 350. When transit node X detects an error associated with packet 320 (e.g., PTB error, TTL expiration, etc.), transit node X rewrites the header of packet 320 and creates a rewritten, or modified, packet 360. The source address field at 321 and payload 328 of packet 320 can remain the same in the rewritten packet, as source address field at 361 and payload 368, respectively. As shown in destination address field at 361, the destination address field at 321 can be rewritten as the address of the last segment from the segment list (SL) of SRH 325 of packet 320. The last segment is based on the routing order of the segments in the segment list, which represent a forward path for the packet. The last segment is segment Z in this example. Next header field 322 can be changed from SRH to TCP (or other appropriate header indicator) as shown in next header field 362. In addition, SRH 325 can be removed to create rewritten packet 360. Rewritten packet 360 can be added to the payload of error message 350. Specifically, in at least one embodiment, rewritten packet 360 can be added to the payload of ICMPv6 PDU 358.

Figure 3D:
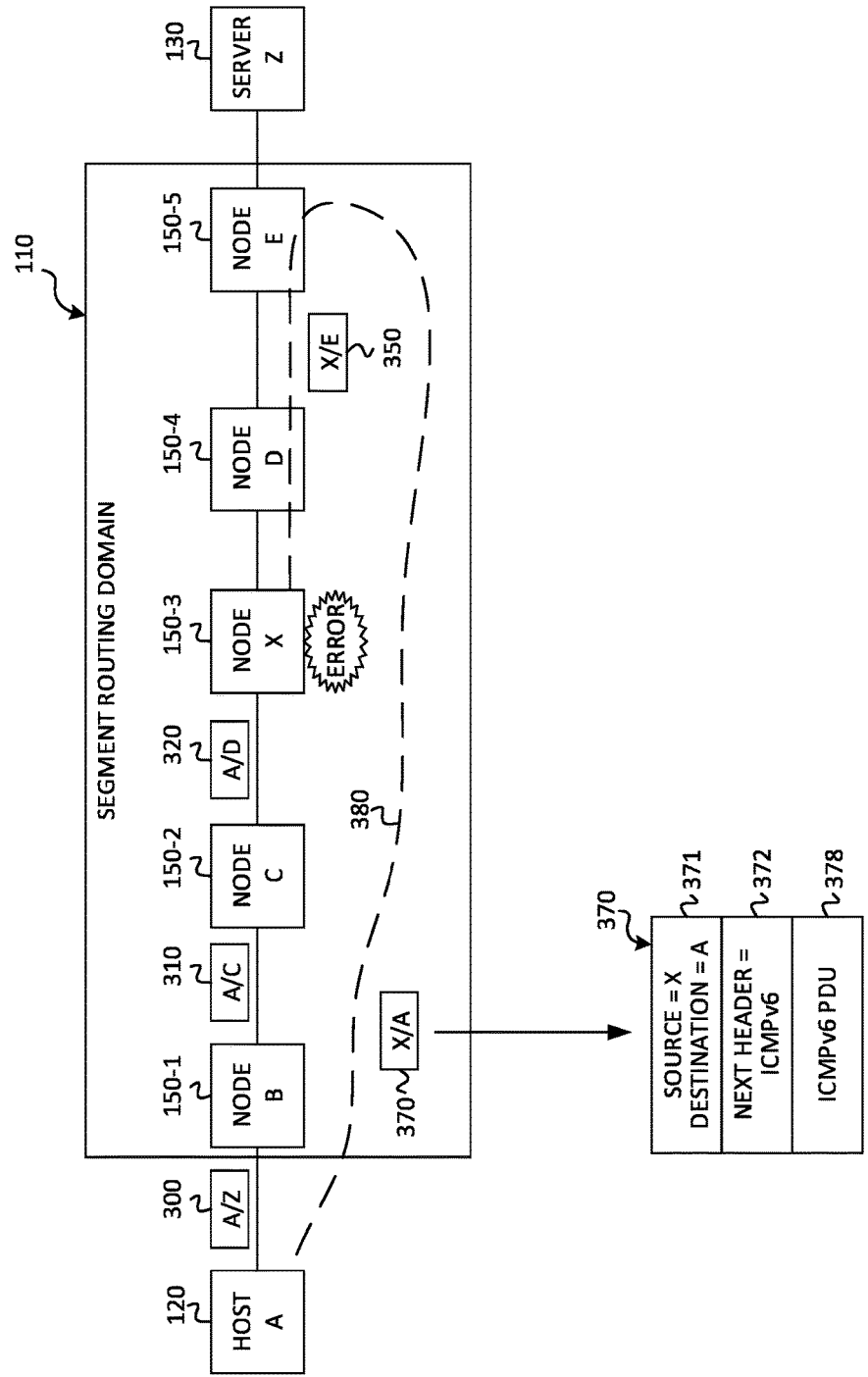

Once the error message is complete, it may be forwarded to the destination address indicated at 351, which is egress node E 150-5 in this example scenario. FIG. 3D illustrates a possible path 380 of error message 350. First, error message 350 may be forwarded to node E. Node E can modify error message 350 to error message 370. Error message 370 can include source and destination address fields 371 set to the address of transit node X and the address of host A, respectively. Error message 370 can also include a next header 372 set to ICMPv6, and an ICMPv6 PDU 378 with a payload that includes the rewritten packet. Node E forwards packet 370 toward host A. It should be apparent that packets 350 and 370 might traverse other nodes and/or transit nodes between transit node X and host A.

The example presented by FIGS. 3A-3D represents a single header encapsulation implementation. It should be noted that the broad concepts disclosed herein might also be applied to other types of implementations such as double header encapsulation. Generally, the broad concepts disclosed herein may be applied to any nodes with segment routing (e.g., segment routing over IPv6) capabilities, regardless of the specific implementation. This can ensure that, in any implementation, segment routing nodes that do not have knowledge of the original source node can send error messages with useful payloads back to the correct original source node. As a result, source nodes that originate flows that traverse a segment routing domain can correlate resulting error messages to the correct flows.

Figure 4A:
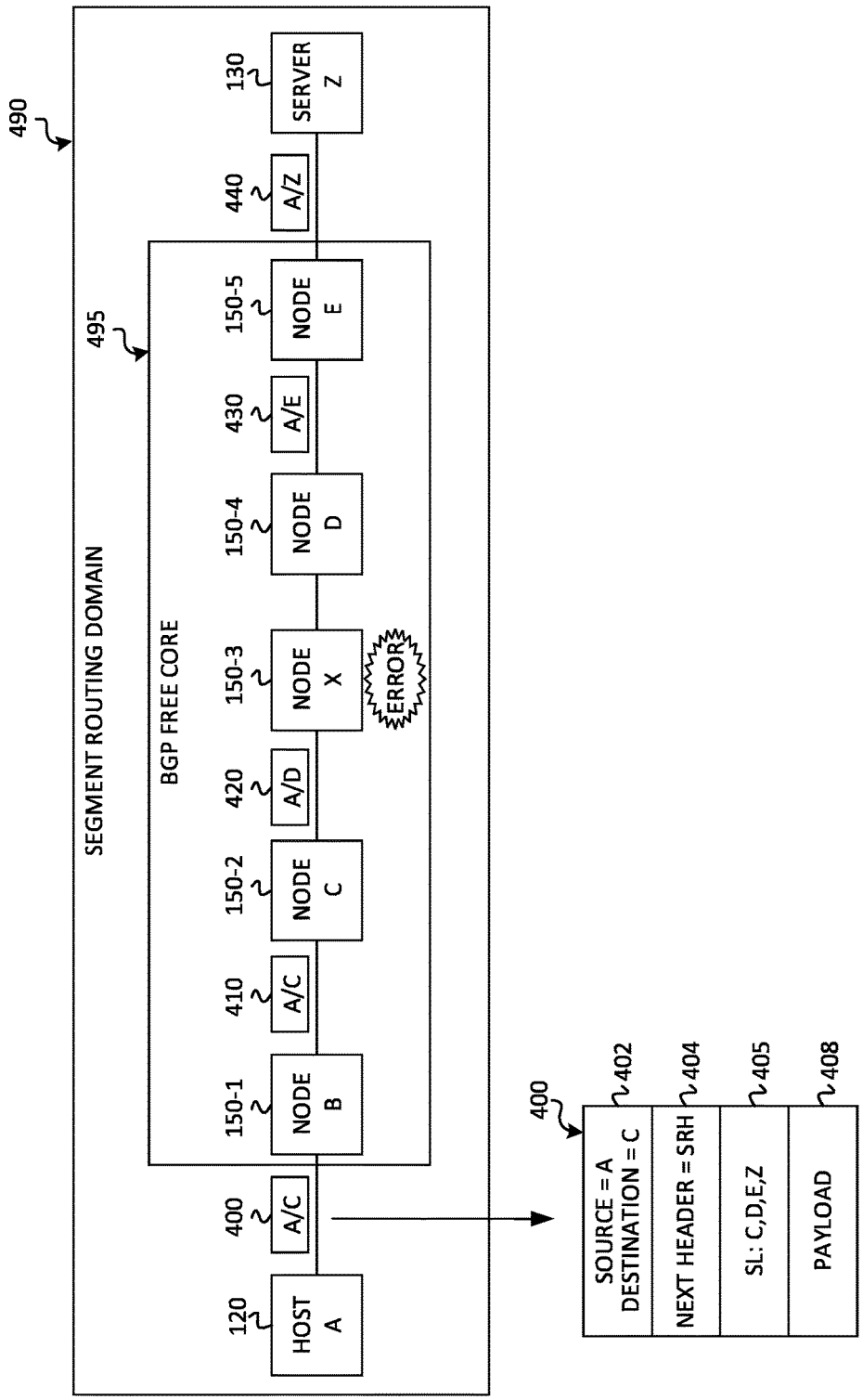
FIGS. 4A-4D are simplified block diagrams illustrating another example scenario of enhanced error signaling and error handling in the communication system according to at least one embodiment.

Turning to FIGS. 4A-4D, block diagrams are provided to illustrate an example scenario of error signaling and error handling in communication system 100 according to at least one embodiment. The example presented by FIGS. 4A-4D represents an end-to-end segment routing implementation using ICMPv6. As shown in FIG. 4A, nodes 150-1 through 150-5 are located within a border gateway protocol (BGP) free core 495. A segment routing domain 490 is defined end-to-end from host A 120 to server Z 130, inclusive of BGP free core 495. Node B 150-1, node C 150-2, node D 150-4, and node E 150-5 are nodes in a routing path between host A 120 and server Z 130. Node X 150-3 is a transit node in the path between node C and node D.

In this example, host A 120 initiates a network flow to server Z 130. Packet 400 is an example packet of the network flow originated by host A 120 to send to server Z 130. Packet 400 includes source and destination address fields 402, a next header field 404, a segment routing header (only segment list 405 is shown), and a payload field 408. In this example, packet 400 includes a source address for host A 120 and a destination address for node C 150-2. Next header field 404 is set to SRH because host A 120 is within segment routing domain 490 and, therefore, adds a segment routing header to its packets. Segment list 405 is provided with segments C, D, E, Z of a routing path corresponding to node C, node D, node E, and server Z, respectively. Payload field 408 can be a TCP payload in at least one embodiment. Although not shown, it will be apparent that the payload field may be part of a protocol data unit that includes one or more headers.

If no errors are detected by any node for packet 400, then packet 400 can be sent from host A and pass through nodes B, C, X, D, and E to reach server Z. The nodes can modify the packet headers to route the packet as shown by packets 400, 410, 420, 430 and 440. The segment routing header may be present in every packet due to the end-to-end segment routing domain 490.

If an error is detected in a node in BGP free core 495, however, the packet may be dropped and not reach server Z. Embodiments disclosed herein enable error signaling and error handling when an error is detected in a node of BGP free core 495, or other nodes that are located within the routing path, but outside of BGP free core 495. In the example shown in FIG. 4A, an error may be detected at transit node X 150-3, after receiving packet 420 from node C. If packet 420 is to be dropped, where it is not forwarded to the final destination, an error message (e.g., ICMPv6) can be generated and forwarded to the original source, host A 120.

Figure 4B:
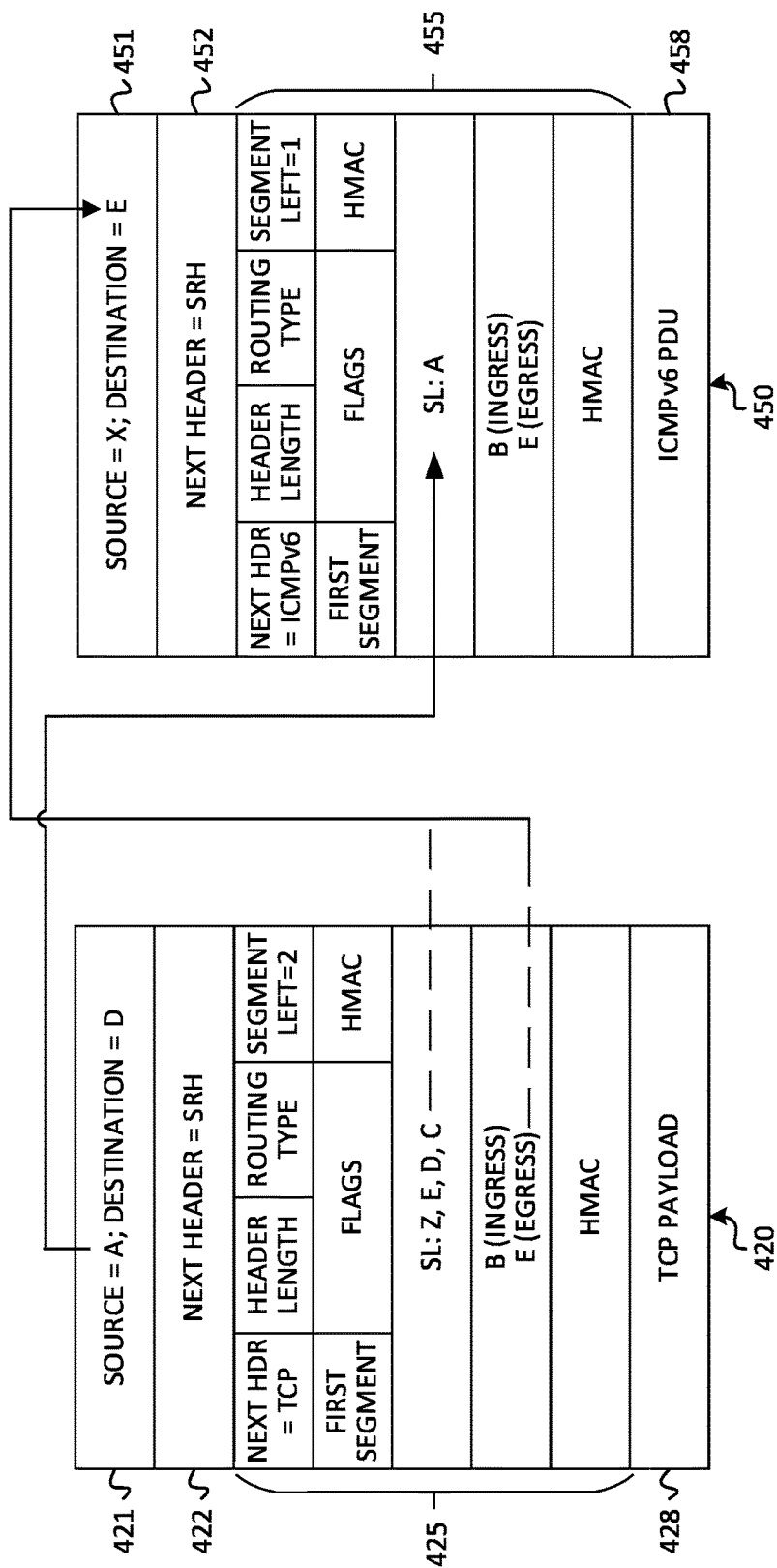

FIG. 4B illustrates additional possible details of packet 420 received by transit node X, and an example error message 450. Packet 420 can include source and destination address fields 421 set to the address of host A and the address of node D, respectively. Packet 420 can also include a next header field 422 set to SRH, a segment routing header (SRH) 425, and a payload 428 (e.g., TCP).

Transit node X can generate error message 450 and derive a new segment routing header (SRH) 455 to append to the error message. Error message 450 can include source and destination address fields 451, a next header field 452, new SRH 455, and an ICMPv6 packet data unit (PDU) 458. Error message 450 may be generated by transit node X and populated with information from packet 420 in the same or similar manner as previously described herein with reference to error message 350 and packet 320 of FIGS. 3A-3D.

Figure 4C:
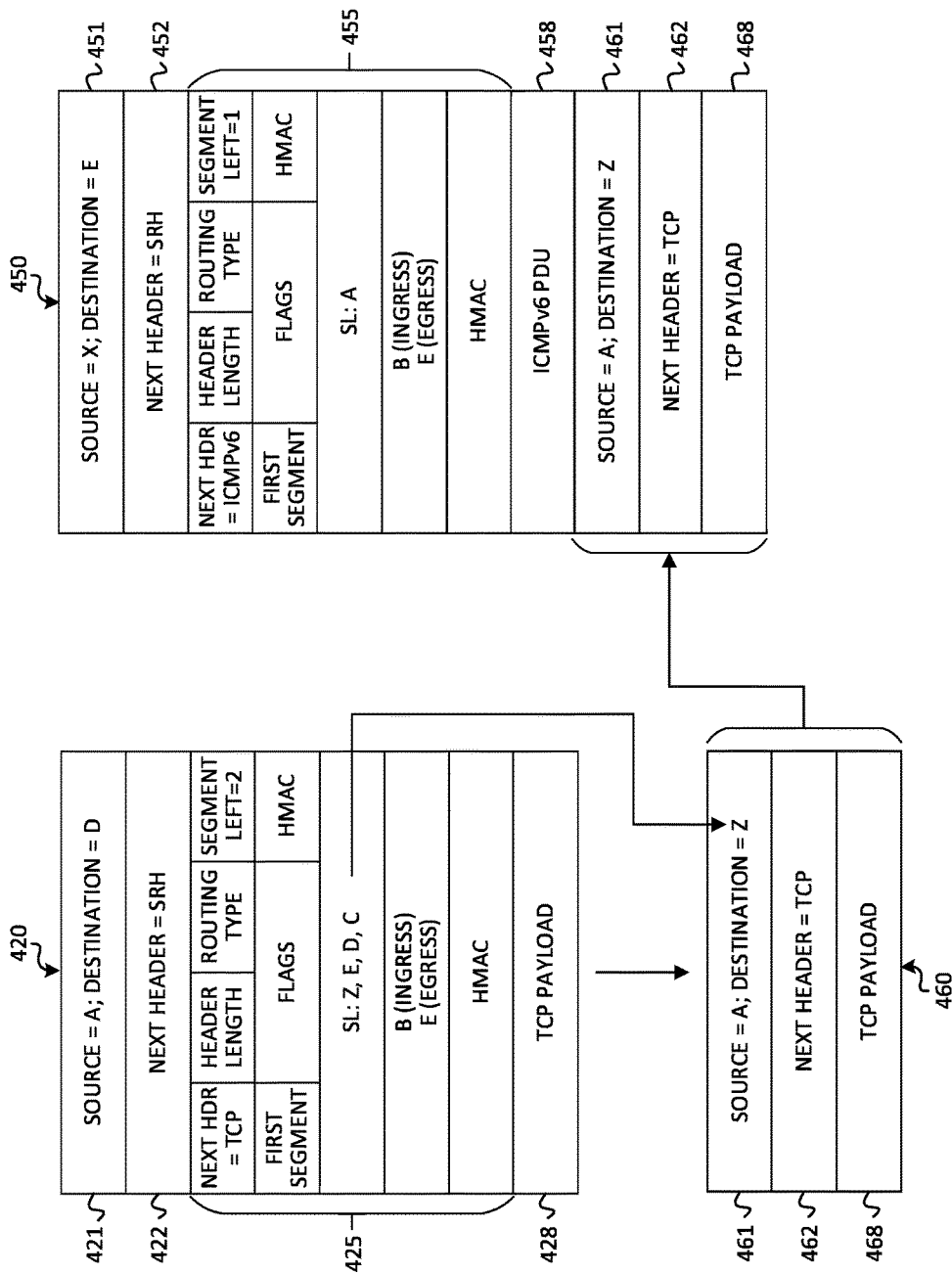

FIG. 4C illustrates additional details related to transit node X 150-3 generating error message 450. FIG. 4C shows packet 420, a rewritten packet 460, and error message 450 with rewritten packet 460 added to the payload of error message 450. The rewritten packet can include source and destination fields 461, a next header field 462, and a payload field 468. When transit node X detects an error associated with packet 420 (e.g., PTB error, TTL expiration, etc.), transit node X rewrites the header of packet 420, creates rewritten, or modified, packet 460, and appends rewritten packet 460 to error message 450 in the same or similar manner as previously described herein with reference to error message 350, packet 320, and rewritten packet 360 of FIGS. 3A-3D.

Figure 4D:
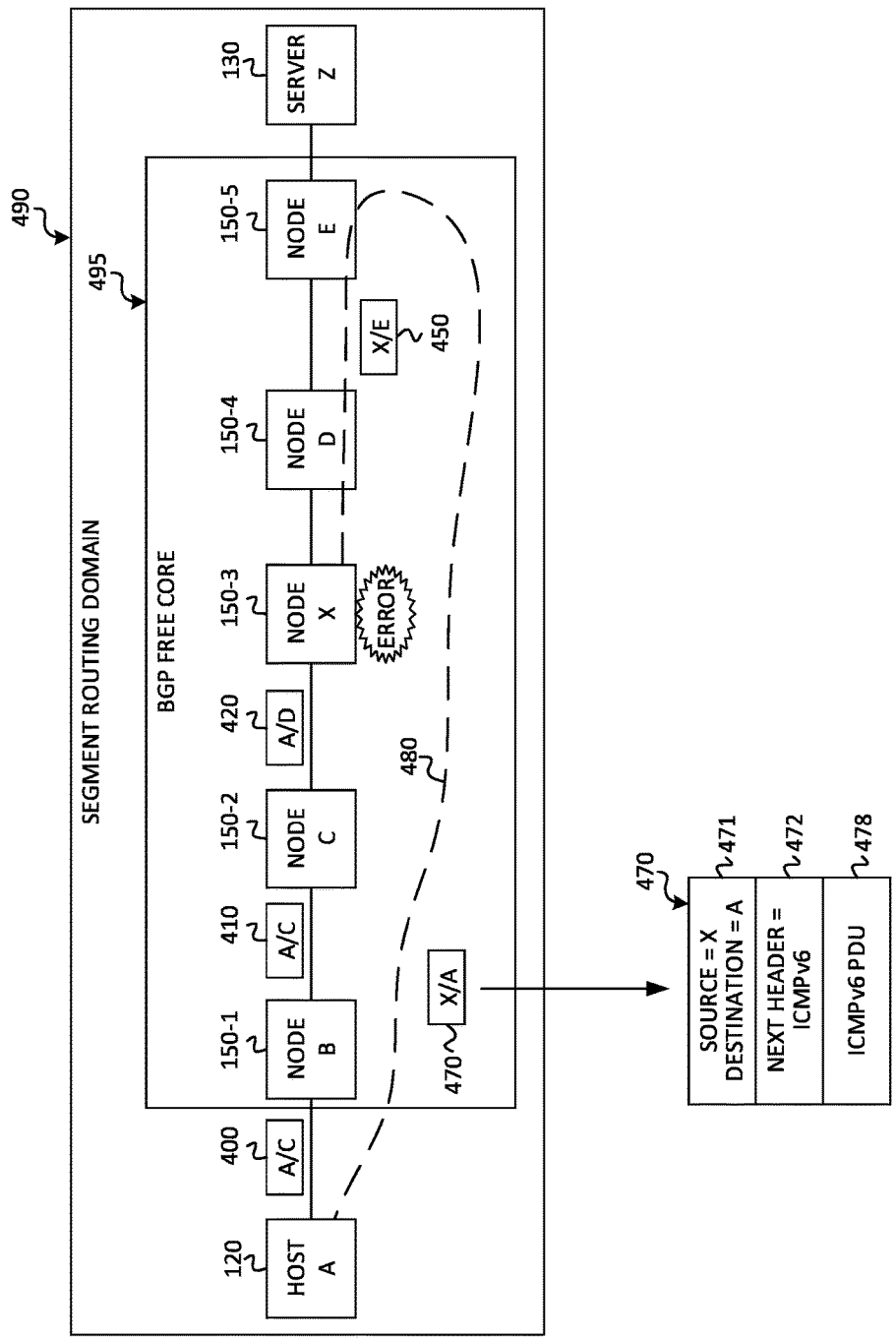

Once error message 450 is complete, it may be forwarded to the destination address indicated at 451, which is node E 150-5 in this example scenario. FIG. 4D illustrates a possible path 480 of error message 450. First, error message 450 may be forwarded to node E. Node E can modify error message 450 to error message 470. Error message 470 can include source and destination address fields 471 set to the address of transit node X and the address of host A, respectively. Error message 470 can also include a next header 472 set to ICMPv6, and an ICMPv6 PDU 478 with a payload that includes the rewritten packet. Node E forwards packet 470 toward host A. It should be apparent that packets 450 and 470 might traverse other nodes and/or transit nodes between transit node X and host A.

Figure 5A:
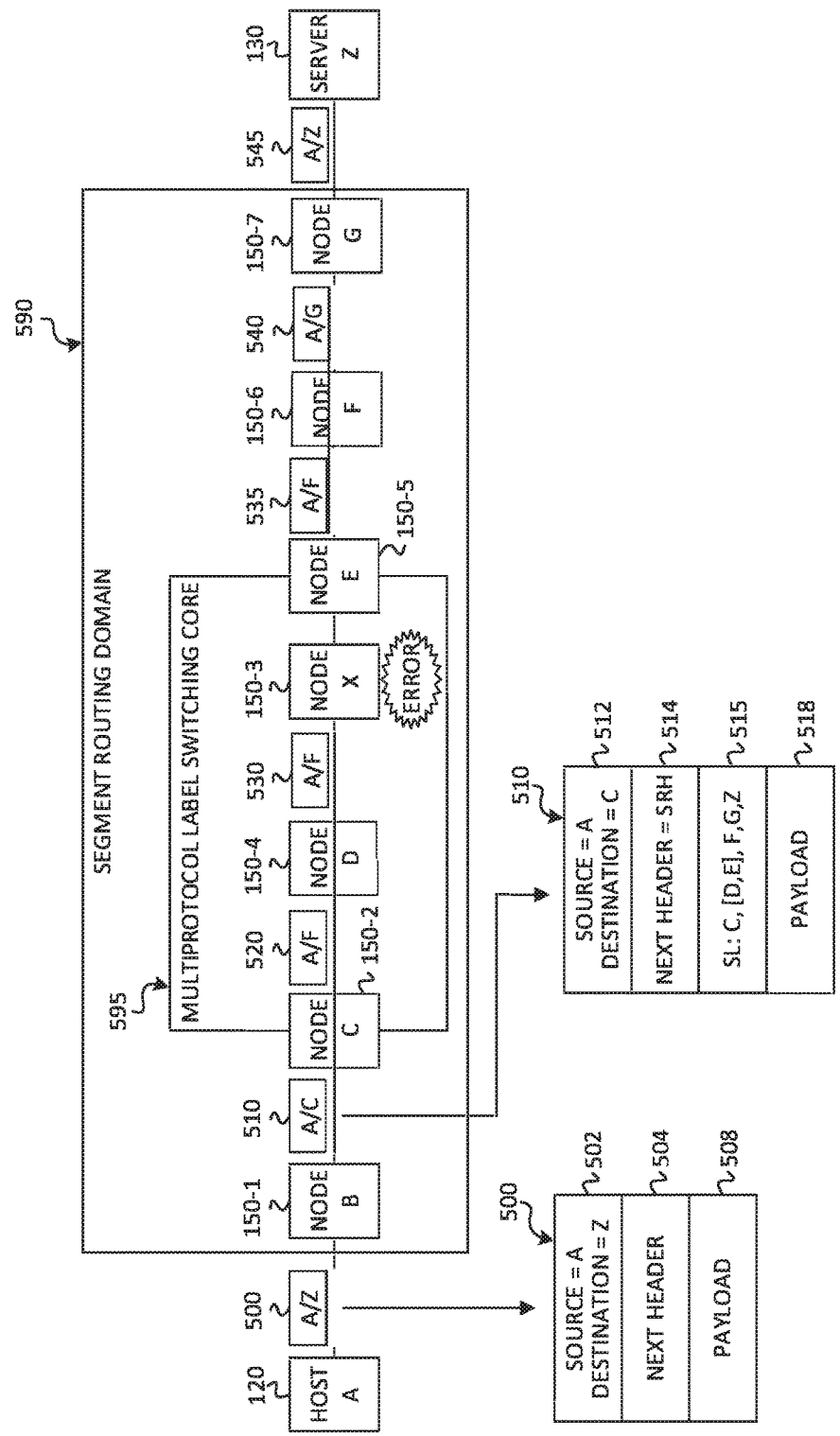

Turning to FIGS. 5A-5D, block diagrams are provided to illustrate an example scenario of error signaling and error handling in communication system 100 according to at least one embodiment. The example presented by FIGS. 5A-5D represents a multiprotocol label switching (MPLS) segment routing implementation using ICMPv6. As shown in FIG. 5A, nodes 150-2 through 150-5 are part of an MPLS core 595. A segment routing domain 590 is defined from node 150-1 to node 150-7. Node B 150-1, node C 150-2, node D 150-4, node E 150-5, node F 150-6, and node G 150-7 are nodes in a routing path between host A 120 and server Z 130. Node X 150-3 is a transit node in the path between node D and node E.

In this example, host A 120 initiates a network flow to server Z 130. Packet 500 is an example packet of the network flow originated by host A 120 to send to server Z 130. Packet 500 includes source and destination address fields 502, a next header field 504 and a payload field 508. In this example, packet 500 includes a source address for host A 120 and a destination address for server Z 130. Payload field 508 can be a TCP payload in at least one embodiment. Although not shown, it will be apparent that the payload field may be part of a protocol data unit that includes one or more headers.

If no errors are detected by any node for packet 500, then packet 500 can be sent from host A and pass through nodes B, C, D, X, E, F and G to reach server Z. The nodes can modify the packet headers to route the packet. Nodes in MPLS core 595 can add and remove labels to the packet for routing purposes. For example, node B receives packet 500 and modifies it as packet 510 with a source address of host A and a destination address of node C. In this example, node B is the ingress node of segment routing domain 590 and, therefore, node B can add a segment routing header (SRH) to packet 510. Packet 510 can include source and destination address fields 512, a next header field 514 set to SRH, a segment routing header (only segment list 515 of the SRH is shown), and a payload field 518. The segment list can include segments C, [D, E], F, G, and Z. Node B forwards packet 510 to node C. Node C receives packet 510 and modifies it as packet 520 with a source address for host A and a destination address for node F. Because node C is in MPLS core 595, labels can also be added to the packet. A first label (D) for node D and a second label (E) for node E can be inserted before the source and destination fields of packet 520. Node C can forward packet 520 toward node D. Node D receives packet 520 and modifies it as packet 530 by removing label (D), leaving label (E) inserted before the source address of host A and the destination address of node F. Node D forwards packet 530 toward node E. Assuming no errors are detected, transit node X can receive packet 530 and forward the packet to node E. Node E receives packet 530 and modifies it as packet 535 by removing label (E), leaving the source address of host A and the destination address of node F. Node E forwards packet 535 toward node F. Node F receives packet 535 and modifies it as packet 540 with a source address for host A and a destination address for node G. Node F forwards packet 540 toward node G. Node G receives packet 540 and modifies it as packet 545 with a source address of host A and a destination address of server Z. Node G forwards packet 545 to the final destination, server Z.

If an error is detected in a node in MPLS core 595 (or any other node in the segment routing domain), however, the packet may be dropped and not reach server Z. Embodiments disclosed herein enable error signaling and error handling when an error is detected by a node in MPLS core 595 (or any other node in the segment routing domain). In the example shown in FIG. 5A, an error may be detected at transit node X 150-3, after receiving packet 530 from node D. If packet 530 is to be dropped, where it is not forwarded to the final destination, an error message (e.g., ICMPv6) can be generated and forwarded to the original source, host A 120.

Figure 5B:
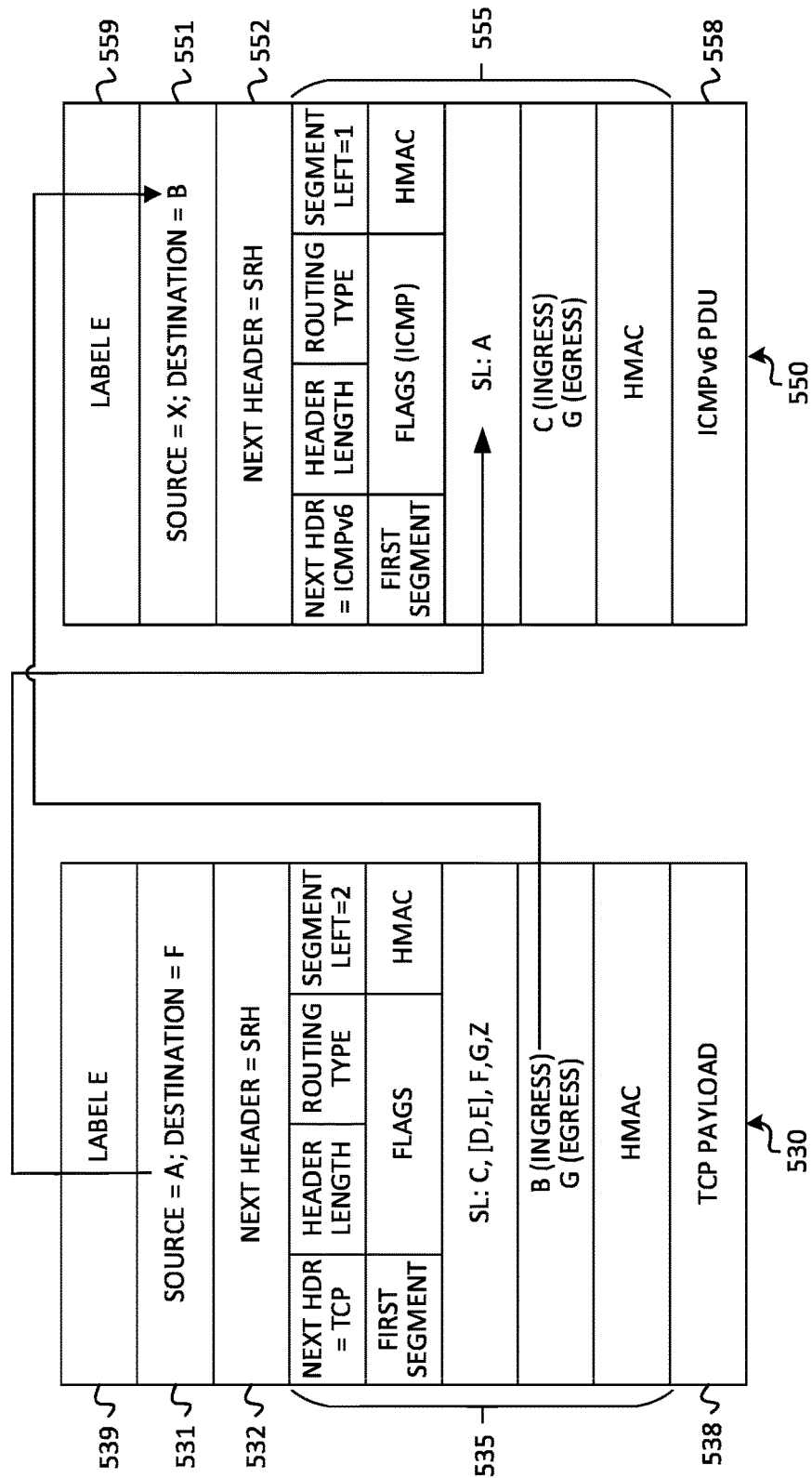

FIG. 5B illustrates additional possible details of packet 530 received by transit node X, and an example error message 550. Packet 530 can include a label 539 for node E, source and destination address fields 531 set to the address of host A and the address of node F, respectively. Packet 530 can also include a next header field 532 set to SRH, a segment routing header (SRH) 535, and a payload 538 (e.g., TCP).

Transit node X can generate error message 550 and derive a new segment routing header (SRH) 555 to append to the error message. Error message 550 can include source and destination address fields 551, a next header field 552, new SRH 555, and an ICMPv6 packet data unit (PDU) 558. The address of the node generating the error message, which is transit node X in this example, can be added to the error message in the source address field at 551 to serve as the source address for the error message.

Information from packet 530 can be leveraged to ensure that error message 550 is delivered to the original source, host A. In particular, the source address field at 531 of packet 530 can be copied and added as the last segment in the segment list (SL) of new SRH 555 of error message 550. In at least some embodiments, the segment list of new SRH 555 may only contain one segment. The segment left field of new SRH 555 can be set to one, so that the last segment (i.e., address of host A) of the segment list is processed at the node indicated by the destination address at 551. The next header field of SRH 555 can be set to ICMPv6 in at least one embodiment, which indicates ICMPv6 PDU 558. Optionally, a flag (e.g., ICMP) or policy of SRH 555 of error message 550 may also be set.

The destination address field at 551 of error message 550 may be populated by information from SRH 535 of packet 530. Packet 530 may carry ingress/egress segment routing node details such as addresses of the ingress and egress nodes of segment routing domain 590. The ingress node may be a segment routing (SR) provider edge (PE) node, in at least one embodiment. These details may be stored in a policy list of SRH 535. In this example, the address of ingress node B may be copied from packet 530 and added to the destination address field at 551 of error message 550, to serve as the destination address of the error message. The ingress SR PE node can route the error message to the actual source, host A, after receiving the error message.

Figure 5C:
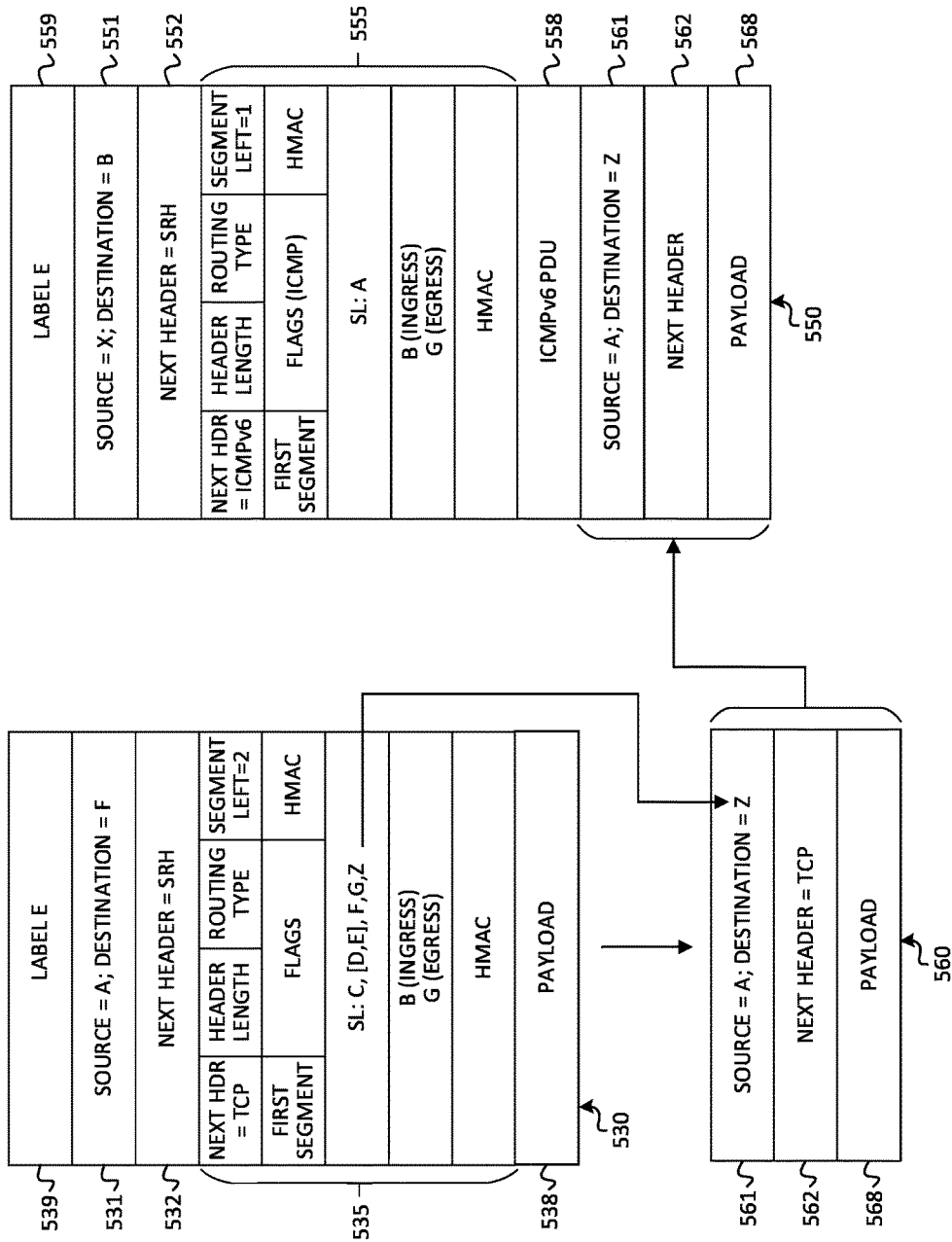

FIG. 5C illustrates additional details related to transit node X 150-3 generating error message 550. FIG. 5C shows packet 530, a rewritten packet 560, and error message 550 with rewritten packet 560 added to the payload of error message 550. The rewritten packet can include source and destination fields 561, a next header field 562, and a payload field 568. When transit node X detects an error associated with packet 530 (e.g., PTB error, TTL expiration, etc.), transit node X rewrites the header of packet 530 and creates a rewritten, or modified, packet 560, and appends rewritten packet 560 to error message 550 in the same or similar manner as 3A-3D.

Once the error message is complete, it may be forwarded to the node indicated by label 559, which is node E 150-5 in this example scenario. FIG. 5D illustrates a possible path 580 of error message 550. First, error message 550 may be forwarded to node E. Node E can modify error message 550 to error message 570. Error message 570 can include source and destination address fields 571 set to the address of transit node X and the address of ingress node B, respectively. However, label 559 of error message 550 can be removed such that it is not included in error message 570. Error message 570 can also include a next header 572 set to ICMPv6, and ICMPv6 PDU 578 with a payload that includes the rewritten packet. Node E forwards packet 570 toward node B. Node B can then rewrite packet 570 and forward the rewritten packet toward the final destination, host A. It should be apparent that packets, such as 550 and 570, might traverse other nodes and/or transit nodes between transit node X and node B.

Figure 6A:
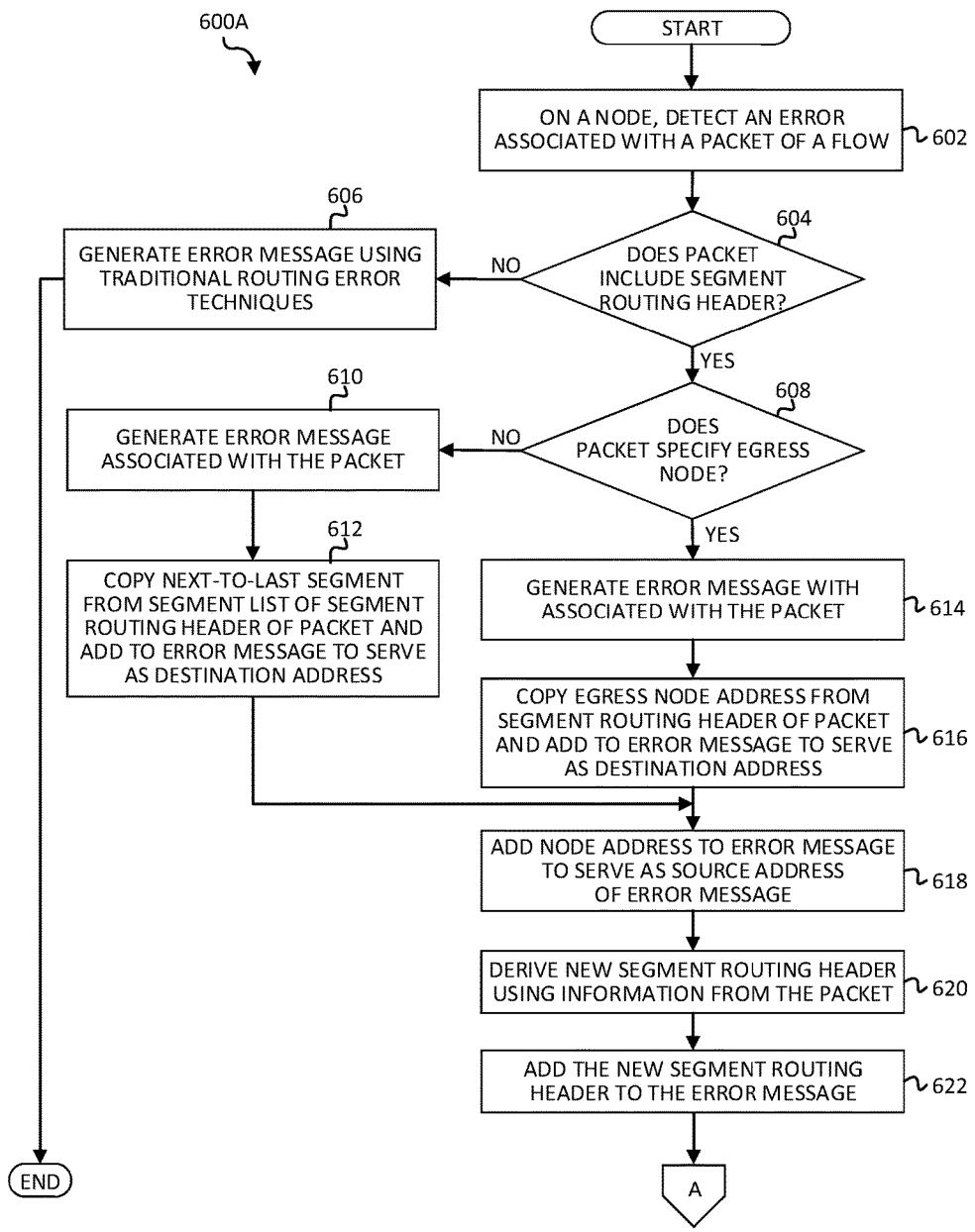

FIGS. 6A and 6B are simplified flowcharts 600A and 600B, respectively, illustrating potential operations that may be associated with embodiments described herein. In at least one embodiment, one or more sets of operations correspond to activities of FIGS. 6A and 6B. In at least one embodiment, a transit node (e.g., 150-3) or another one of nodes 150 may comprise means such as one or more processors (e.g., processors 157), for performing the operations. In one example, at least some operations shown in flowcharts 600A and 600B may be performed by an error handling module (e.g., 154) and/or segment routing logic (e.g., 152).

In flowchart 600A of FIG. 6A, at 602, an error associated with a packet of a flow in a segment routing domain of a network is detected. The error could include, but is not limited to, the size of the packet exceeding a maximum transmission unit (MTU) size on the network path and prompting a Packet Too Big (PTB) error message, or the packet reaching a maximum number of hops in the network path (e.g., time-to-live expires or hop limit field is reached) prompting a Time Exceeded error message. In at least one embodiment, a detected error is any error that prompts the generation of an ICMPv6 error message.

At 604, a determination is made as to whether the packet includes a segment routing header. If the packet does not include a segment routing header, then at 606, an error message could be generated using traditional routing error techniques (e.g., IPv6/ICMPv6) to route the error message back to the original source node.

If the packet is determined to have a segment routing header at 604, however, then at 608, a determination can be made as to whether the packet specifies the egress node of the segment routing domain. In an end-to-end implementation, the determination can be made as to whether the packet specifies the egress node of the BGP free core of the segment routing domain. If the packet does not specify the ingress/egress node details in the segment routing header, then at 610, an error message associated with the packet can be generated. At 612, an address of a node in the segment routing domain (e.g., egress node in segment routing domain, egress node of BGP free core) can be determined and added to the error message to serve as a destination address of the error message. The address of the node can be determined by identifying the next-to-last segment (based on routing order) in a segment list of the segment routing header of the packet. In at least one embodiment, the next-to-last segment can be copied and added to a destination address field (e.g., 351, 451, and 551) of the error message.

With reference again to 608, if a determination is made that the packet does specify the ingress/egress node details, then at 614, an error message associated with the packet can be generated. At 616, an address of the egress node can be added to the error message to serve as a destination address of the error message. The egress node address can be determined from identifying the address in a policy list of the segment routing header of the packet, where the policy list contains the ingress/egress node details. The egress node address can be copied from the segment routing header and added to the error message in the destination address field of the error message (e.g., 351, 451, and 551). As previously described herein, in some embodiments (e.g., MPLS), an address of an ingress node of the segment routing domain may be copied from the segment routing header and added to the error message in the destination address field of the error message.

Other operations may be performed to complete the generation of the error message, regardless of how the destination address is obtained. At 618, an address of the node generating the error message can be added to a source address field of the error message to serve as the source address for the error message.

At 620, a new segment routing header can be derived for the error message using information from the packet. In particular, the source address from the packet can be copied and added to the new segment routing header as the last segment in the segment list. The segment left field in the new segment routing header can be set to one to indicate that the added segment is the last segment remaining in the segment list to be processed. In addition, a new flag (or policy) may be set in the new segment routing header. At 622, the new segment routing header can be added to the error message.

Turning to flowchart 600B of FIG. 6B, at 630, the packet can be rewritten by: (1) replacing the destination address in the packet with a final destination address associated with the packet, and (2) removing the segment routing header from the packet. The final destination address can be determined by identifying a last segment in the segment list of the segment routing header of the packet. The segment list contains one or more segments (e.g., IPv6 addresses) representing nodes of a forward path for the packet. A segment is a 'last segment' of the one or more segments based on a routing order of the segments in the path. In at least some implementations, the segments are provided in reverse routing order in the segment list. For example, the last segment in the route is in the first position of the list at segment list [0] (e.g., segment Z in FIGS. 3B-3C, 4B-4C).

At 632, the rewritten packet (with the final destination address and without the segment routing header) can be added to the payload of the error message. At 634, the error message can be forwarded to the destination address of the error message (e.g., next-to-last segment from the segment list of the segment routing header of the packet, or egress/ingress node address from the segment routing header of the packet). It should be noted that rewriting the packet to produce the rewritten packet could be accomplished using any suitable techniques including, but not limited to, modifying the data within the packet to be dropped to produce the rewritten packet. In a possible alternative, a packet may be rewritten by using data from the packet to be dropped to produce a separate rewritten packet in a separate memory area from the packet to be dropped.

Variations and Implementations

In certain example implementations, the enhanced error signaling and handling capabilities outlined herein may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., network elements, nodes, hosts, and servers) can include memory for storing information to be used in achieving the enhanced error signaling and handling capabilities, as outlined herein. Additionally, these elements may include at least one processor that can execute software, an algorithm, or other instructions to perform the enhanced error signaling and handling operations, as disclosed herein. These elements may further keep information, to be used in achieving the enhanced error signaling and handling capabilities as discussed herein, in any suitable memory element (TCAM, random access memory (RAM), read only memory (ROM), EPROM, EEPROM, ASIC, etc.), software, hardware, or in any other suitable component, device, or object where appropriate and based on particular needs. Any of the memory items discussed herein (e.g., repositories, stores, databases, tables, caches, buffers, etc.) should be construed as being encompassed within the broad term 'memory element.' Similarly, any of the potential processing elements, modules, and machines described herein should be construed as being encompassed within the broad term 'processor.' Each of the network elements, nodes, hosts, and servers can also include suitable interfaces for receiving, transmitting, and/or otherwise communicating data or information in a network environment.

Note that with the examples provided herein, interaction may be described in terms of two, three, or more elements (e.g., network elements, nodes, hosts, servers). However, this has been done for purposes of clarity and example only. In certain cases, it may be easier to describe one or more of the functionalities of a given set of flows by only referencing a limited number of elements. It should be appreciated that the systems described herein are readily scalable and can accommodate a large number of components (e.g., hosts, servers, nodes), as well as more complicated/sophisticated arrangements and configurations. Accordingly, the examples provided should not limit the scope or inhibit the broad teachings of the enhanced error signaling and error handling system as potentially applied to a myriad of other architectures or implementations.

As used herein, unless expressly stated to the contrary, use of the phrase 'at least one of' refers to any combination of the named items, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular items (e.g., element, condition, module, activity, operation, etc.) they precede. Unless expressly stated to the contrary, the use of these terms is not intended to indicate any type of order, rank, importance, temporal sequence, or hierarchy of the items. For example, 'first X' and 'second X' are intended to designate two separate X elements that are not necessarily limited by any order, rank, importance, temporal sequence, or hierarchy of the two elements.

Note that in this specification, references to "optimize," "optimization," "optimized", "optimal" and related terms are terms of art that refer to improvements in speed, efficiency, and/or results of a specified outcome and do not purport to indicate that a process for achieving the specified outcome has achieved, or is capable of achieving, a perfectly speedy/perfectly efficient state.

It is also important to note that the activities, interactions, and operations shown and described herein illustrate only some of the possible scenarios and patterns that may be executed by, or within, the nodes with enhanced error signaling and handling capabilities. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably.

The preceding operational flows have been offered for purposes of example and discussion. Substantial flexibility is provided by nodes with enhanced error signaling and handling capabilities in that any suitable arrangements, chronologies, configurations, and timing mechanisms may be provided without departing from the teachings of the present disclosure. Additionally, these activities can be facilitated by various modules and/or components (e.g., segment routing logic 152, error handling module 154, etc.) which can be suitably combined in any appropriate manner, or partitioned in any appropriate manner, and which may be based on particular configuration and/or provisioning needs.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of the enhanced error signaling and handling of communication system 100 as disclosed herein.

What is claimed is:

1. A method, comprising:
generating an error message based on an error associated with a packet originated from a source address;
adding to the error message an address of a node in a segment routing domain of a network to serve as a destination address of the error message, wherein the destination address of the error message is different from the source address of the packet;
adding a new segment routing header to the error message;
rewriting the packet, the rewriting including replacing a destination address in the packet with a final destination address associated with the packet;
adding the rewritten packet to the error message; and
forwarding the error message to the destination address of the error message.

2. The method of claim 1, further comprising:
deriving the new segment routing header from information in the packet.

3. The method of claim 1, further comprising:
obtaining a copy of the source address of the packet;
adding the copy of the source address as a segment in a segment list of the new segment router header; and
indicating the segment is the last segment remaining in the segment list to be processed.

4. The method of claim 3, further comprising:
setting a segment left field of the new segment routing header to a value of one to indicate the segment is the last segment remaining in the segment list to be processed.

5. The method of claim 3, wherein the segment list includes one or more segments representing one or more nodes in a path along which the error message is to be routed.

6. The method of claim 1, wherein rewriting the packet includes removing a segment routing header of the packet.

7. The method of claim 1, wherein a segment list of a segment routing header of the packet includes one or more segments representing one or more nodes of the network, the method further comprising:
   determining the final destination address by identifying the last segment in the segment list based on a routing order of the one or more segments.

8. The method of claim 1, wherein the node in the segment routing domain is an egress node of a Border Gateway Control (BGP) free core of the segment routing domain.

9. The method of claim 1, wherein the node in the segment routing domain is an egress node of the segment routing domain.

10. The method of claim 9, further comprising:
    determining the address of the node to add to the error message by identifying an address of the egress node in a policy list of a segment routing header of the packet.

11. The method of claim 1, further comprising:
    determining the address of the node to add to the error message by identifying a next-to-last segment in a segment list of a segment routing header of the packet.

12. The method of claim 1, wherein the node in the segment routing domain is an ingress node of the segment routing domain.

13. At least one non-transitory machine readable storage medium including code for execution that, when executed by at least one processor, causes the at least one processor to:
    generate an error message based on an error associated with a packet originated from a source address;
    add to the error message an address of a node in a segment routing domain of a network to serve as a destination address of the error message, wherein the destination address of the error message is different from the source address of the packet;
    add a new segment routing header to the error message;
    rewrite the packet, the rewriting including replacing a destination address in the packet with a final destination address associated with the packet;
    add the rewritten packet to the error message; and
    forward the error message to the destination address of the error message.

14. The at least one non-transitory machine readable storage medium of claim 13, wherein the code for execution, when executed by the at least one processor, causes the at least one processor to:
    obtain a copy of the source address of the packet;
    add the copy of the source address as a segment in a segment list of the new segment router header; and
    indicate the segment is the last segment remaining in the segment list to be processed.

15. The at least one non-transitory machine-readable storage medium of claim 13, wherein to rewrite the packet includes removing a segment routing header of the packet.

16. The at least one non-transitory machine readable storage medium of claim 13, wherein a segment list of a segment routing header of the packet includes one or more segments representing one or more nodes of the network, wherein the code for execution, when executed by the at least one processor, causes the at least one processor to:
    determine the final destination address by identifying the last segment in the segment list based on a routing order of the one or more segments.

17. An apparatus, comprising:
    at least one memory element; and
    logic implemented at least partly in hardware, wherein the logic when executed is to:
        generate an error message based on an error associated with a packet originated from a source address;
        add to the error message an address of a node in a segment routing domain of a network to serve as a destination address of the error message, wherein the destination address of the error message is different from the source address of the packet;
        add a new segment routing header to the error message;
        rewrite the packet, the rewriting including replacing a destination address in the packet with a final destination address associated with the packet;
        add the rewritten packet to the error message; and
        forward the error message to the destination address of the error message.

18. The apparatus of claim 17, wherein the node in the segment routing domain is an egress node of the segment routing domain.

19. The apparatus of claim 18, wherein the logic when executed is to:
    determine the address of the node to add to the error message by identifying an address of the egress node in a policy list of a segment routing header of the packet.

20. The apparatus of claim 17, wherein the logic when executed is to:
    determining the address of the node to add to the error message by identifying a next-to-last segment in a segment list of a segment routing header of the packet.

21. The apparatus of claim 17, wherein the node in the segment routing domain is an ingress node of the segment routing domain.

* * * * *